US012254867B2

(12) United States Patent
Guo et al.

(10) Patent No.: US 12,254,867 B2
(45) Date of Patent: Mar. 18, 2025

(54) SPOKEN LANGUAGE UNDERSTANDING SYSTEM

(71) Applicant: Amazon Technologies, Inc., Seattle, WA (US)

(72) Inventors: Chenlei Guo, Redmond, WA (US); Xing Fan, Redmond, WA (US); Chengyuan Ma, Bellevue, WA (US); Shuting Tang, Seattle, WA (US); Kai Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 17/856,090

(22) Filed: Jul. 1, 2022

(65) Prior Publication Data

US 2023/0047811 A1 Feb. 16, 2023

Related U.S. Application Data

(63) Continuation of application No. 16/913,303, filed on Jun. 26, 2020, now Pat. No. 11,393,456.

(51) Int. Cl.
| | |
|---|---|
| *G10L 15/06* | (2013.01) |
| *G06N 3/08* | (2023.01) |
| *G10L 15/16* | (2006.01) |
| *G10L 15/18* | (2013.01) |
| *G10L 15/22* | (2006.01) |

(52) U.S. Cl.
CPC .............. *G10L 15/063* (2013.01); *G06N 3/08* (2013.01); *G10L 15/16* (2013.01); *G10L 15/1815* (2013.01); *G10L 15/22* (2013.01); *G10L 2015/223* (2013.01); *G10L 2015/225* (2013.01)

(58) Field of Classification Search
CPC ... G10L 15/063; G10L 15/16; G10L 15/1815; G10L 15/22; G10L 2015/223; G10L 2015/225; G06N 3/08
See application file for complete search history.

(56) References Cited

U.S. PATENT DOCUMENTS

| | | | | |
|---|---|---|---|---|
| 9,799,327 B1 * | 10/2017 | Chan | ...................... | G10L 15/183 |
| 2003/0046087 A1 * | 3/2003 | Johnston | ............... | G06F 3/0481 |
| | | | | 704/E15.041 |
| 2018/0129937 A1 * | 5/2018 | Bradbury | ............... | G06N 3/044 |

* cited by examiner

*Primary Examiner* — Eric Yen
(74) *Attorney, Agent, or Firm* — Pierce Atwood LLP

(57) ABSTRACT

A system is provided for a self-learning policy engine that can be used by various spoken language understanding (SLU) processing components. The system also provides for sharing contextual information from processing performed by an upstream SLU component to a downstream SLU component to facilitate decision making by the downstream SLU component. The system also provides for a SLU component to select from a variety of actions to take. A SLU component may implement an instance of the self-learning policy that is specifically configured for the particular SLU component.

20 Claims, 17 Drawing Sheets

SPOKEN LANGUAGE UNDERSTANDING SYSTEM

CROSS-REFERENCE TO RELATED APPLICATION

This application is a continuation of, and claims priority of U.S. Non-Provisional patent application Ser. No. 16/913,303, filed Jun. 26, 2020, and entitled "SPOKEN LANGUAGE UNDERSTANDING SYSTEM," scheduled to issue as U.S. Pat. No. 11,393,456, the contents of which is herein incorporated by reference in its entirety.

BACKGROUND

Spoken language understanding systems have progressed to the point where humans can interact with computing devices using their voices. Such systems employ techniques to identify the words spoken by a human user based on the various qualities of a received audio input. Speech recognition combined with natural language understanding techniques enable speech-based user control of a computing device to perform tasks based on the user's spoken commands. The combination of speech recognition and natural language understanding processing techniques is referred to herein as spoken language understanding.

Spoken language understanding may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
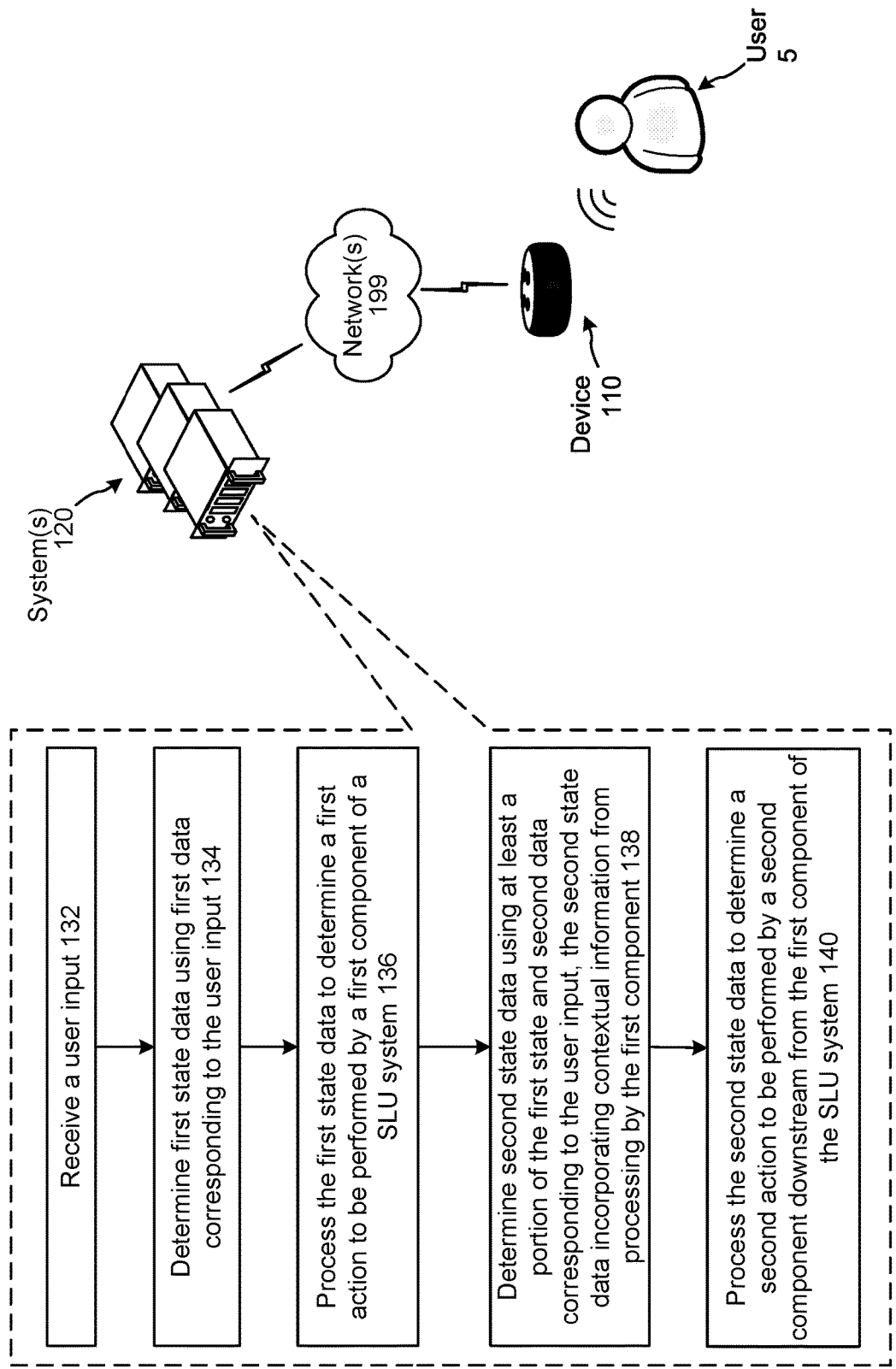
FIG. 1 illustrates a system configured to process a user input according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a spoken language understanding (SLU) system. Text-to-speech (TTS) is a field of concerning transforming textual data into audio data that is synthesized to resemble human speech.

Certain systems may be configured to perform actions responsive to user inputs. For example, for the spoken user input "Alexa, play Adele music," a SLU system may output music sung by an artist named Adele. For further example, for the spoken user input "Alexa, what is the weather," a SLU system may output synthesized speech representing weather information for a geographic location of the user. In a further example, for the spoken user input "Alexa, send a message to John," a SLU system may capture spoken message content and cause same to be output via a device registered to "John."

A SLU system may include an ASR component that processes audio data representing the user input to determine what the user said in the form of one or more ASR hypotheses. The SLU system may also include an NLU component that processes the ASR hypotheses to determine what action the user wants performed in the form of one or more NLU hypotheses. The SLU system may additionally include an alternate input component that may determine whether the user input is likely to cause an error in ASR processing and whether an alternative representation to that determined by the ASR component should be used for further processing to avoid causing friction during the user interaction. The SLU system may also include an NLU merger component (as part of or separate from the NLU component) that may determine whether to use, for further processing, the NLU hypothesis determined by the NLU component or to use an NLU hypothesis corresponding to the alternative representation determined by the alternate input component. The SLU system may also include a post-NLU ranker that selects a skill/application to respond to the user input.

At these various stages of processing, the components may generate data that may include contextual-rich information and that may be useful to downstream components during processing of the user input. The present disclosure describes systems and methods for tracking data at various stages of SLU processing and making that data available to different components of the SLU system.

Systems of the present disclosure may implement a self-learning policy engine that includes a state data tracker that processes various data required at the particular SLU processing stage and an action selection component that selects an action/outcome from a variety of actions as the result of the particular SLU processing stage. The state data tracker enables sharing of data, used at an upstream SLU processing component, with a downstream SLU processing component. The action selection component enables additions or updates to the actions that the component can select without requiring re-programming of the component. Additionally, the action selection component is configured for self-learning to learn from reward signals in choosing the appropriate action at the particular processing stage.

Various SLU components may include their own instance of a self-learning policy engine to process the data required by that SLU component and output an action. For example, the alternate input component may include a first state data tracker that is configured to process data related to the user input, data related to the user and data related to the dialog (e.g., data corresponding to a set of user inputs and corresponding system outputs) to determine first state data. The first state data may be processed by a first action selection component (included in the alternate input component) to select from one of the following actions: (a) do not send an alternative representation; (b) determine and send an alternative representation of the user input using data corresponding to multiple users; (c) determine and send an alternative representation of the user input using data corresponding to the instant user; and (d) determine and send multiple alternative representations of the user input.

Continuing with the example, the NLU merger component may include a second state data tracker that is configured to process data related to one or more NLU hypotheses determined by the NLU component. To leverage the data used by the upstream alternate input component, the second state data tracker may also process the first state data (or a portion of the first state data) to determine second state data. The second state data may be processed by a second action selection component (included in the NLU merger component) to select from one of the following actions: (a) select ASR 1-best hypothesis; (b) override ASR 1-best hypothesis; (c) generate a mixed NLU N-best list using the ASR hypothesis and the alternative representation(s); (d) confirm the ASR 1-best hypothesis with the user; and (e) confirm the alternative representation of the user input with the user. In selecting the action, the second action selection component may use the contextual information available from the upstream SLU component, and thus the present disclosure enables sharing of contextual information from upstream processing components to downstream processing components.

As used herein, an "action" selected by an SLU component refers to a decision, an outcome or some other result of processing data by the SLU component with respect to a user input. The action selected by an SLU component may affect which action a downstream SLU component may select.

FIG. 1 illustrates a system configured to process a user input according to embodiments of the present disclosure, in particular, using components of a spoken language understanding (SLU) system that implements a self-learning policy engine. Although the figures and discussion herein illustrate certain operational steps of the system in a particular order, the steps described may be performed in a different order (as well as certain steps removed or added) without departing from the intent of the disclosure. As illustrated in FIG. 1, the system may include a device 110, local to a user 5, in communication with one or more systems 120 across one or more networks 199. The system(s) 120 may be a SLU system configured to process a user input and generate an output responsive to the user input. The network(s) 199 may include a local or private network or may include a wide network such as the Internet.

The system(s) 120 receives (132) a user input. In some embodiments, the user input may be audio data representing an utterance spoken by the user 5 and captured by the device 110. The system(s) 120 may use one or more components described in relation to FIG. 2 below to process the user input.

The system(s) 120 determines (134) first state data using first data corresponding to the user input. The first data may include user profile data associated with the user 5, dialog data corresponding to the current dialog session, and/or a representation (e.g., text) data of the user input. In some embodiments, the first data is embedding data determined using the user profile data, the dialog data and/or the text data. The system(s) 120 may determine the first state data by processing the first data using one or more trained models (e.g., a neural network). Details on how the system(s) 120 determines the first state data are described below in connection with FIG. 7 and a component state tracker 710.

The system(s) 120 processes (136) the first state data to determine a first action to be performed by a first component of a SLU system. As part of SLU processing of the user input, the system(s) 120 may invoke/execute a first component that may perform a first action with respect to the user input. For example, the system(s) 120 may include an action selection component (e.g., 715 of FIG. 7) to determine which action the first component is to perform based on the features represented in the first state data. More details on how the system(s) 120 determines the first action are described in connection to FIG. 7 and an action selection component 715.

The system(s) 120 determines (138) second state data using at least a portion of the first state data and second data corresponding to the user input. The second data may be data specifically used by a second component of the SLU system to perform a portion of SLU processing with respect to the user input. For example, the second data may be natural language understanding (NLU) data (determined as described in relation to FIG. 4). The second data may be embedding data determined using the NLU data. By using at least a portion of the first state data, the system(s) 120 incorporates contextual information from the first state data that the first component used to perform a portion of SLU processing with respect to the user input. The system(s) 120 may determine the second state data by processing the portion of first state data and the second data using one or more trained models (e.g., a neural network). Details on how the system(s) 120 determines the second state data are described below in connection with FIG. 7 and a component state tracker 710.

The system(s) 120 processes (140) the second state data to determine a second action to be performed by a second component of the SLU system. The second component is downstream from the first component within the SLU processing pipeline. The system(s) 120 may include an action selection component (e.g., 715 of FIG. 7) to determine which action the second component is to perform based on the features represented in the second state data. More details on how the system(s) 120 determines the second action are described in connection to FIG. 7 and an action selection component 715.

Figure 12:
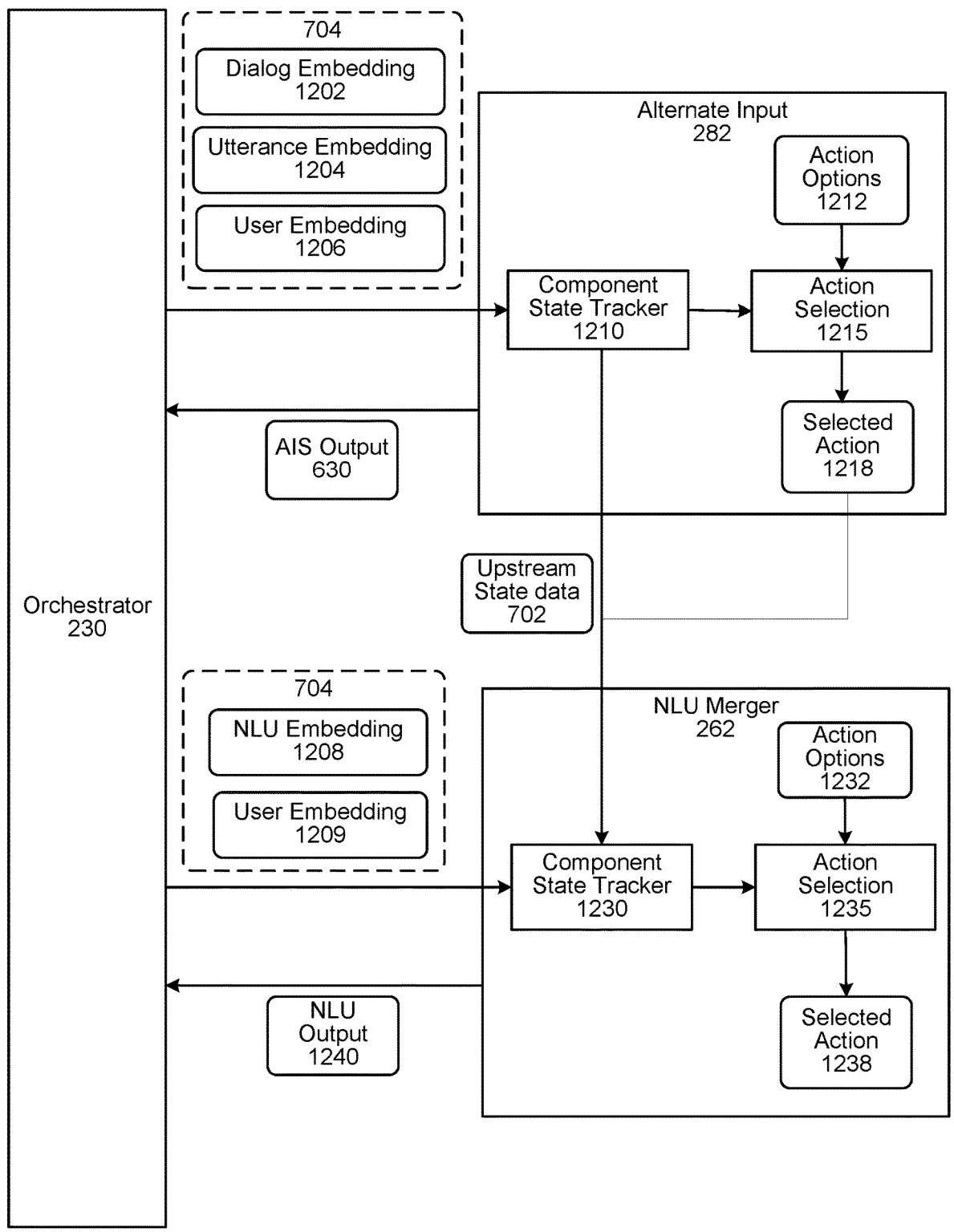
FIG. 12 conceptually illustrates how multiple components of the SLU system may implement self-learning policy engines according to embodiments of the present disclosure.

Further details on how two components of the SLU system may share state data to determine an action to be performed by the respective SLU component is described in relation to FIG. 12, where the first component is an alternate input component 282 and the second component is a NLU merger component 262.

Figure 2:
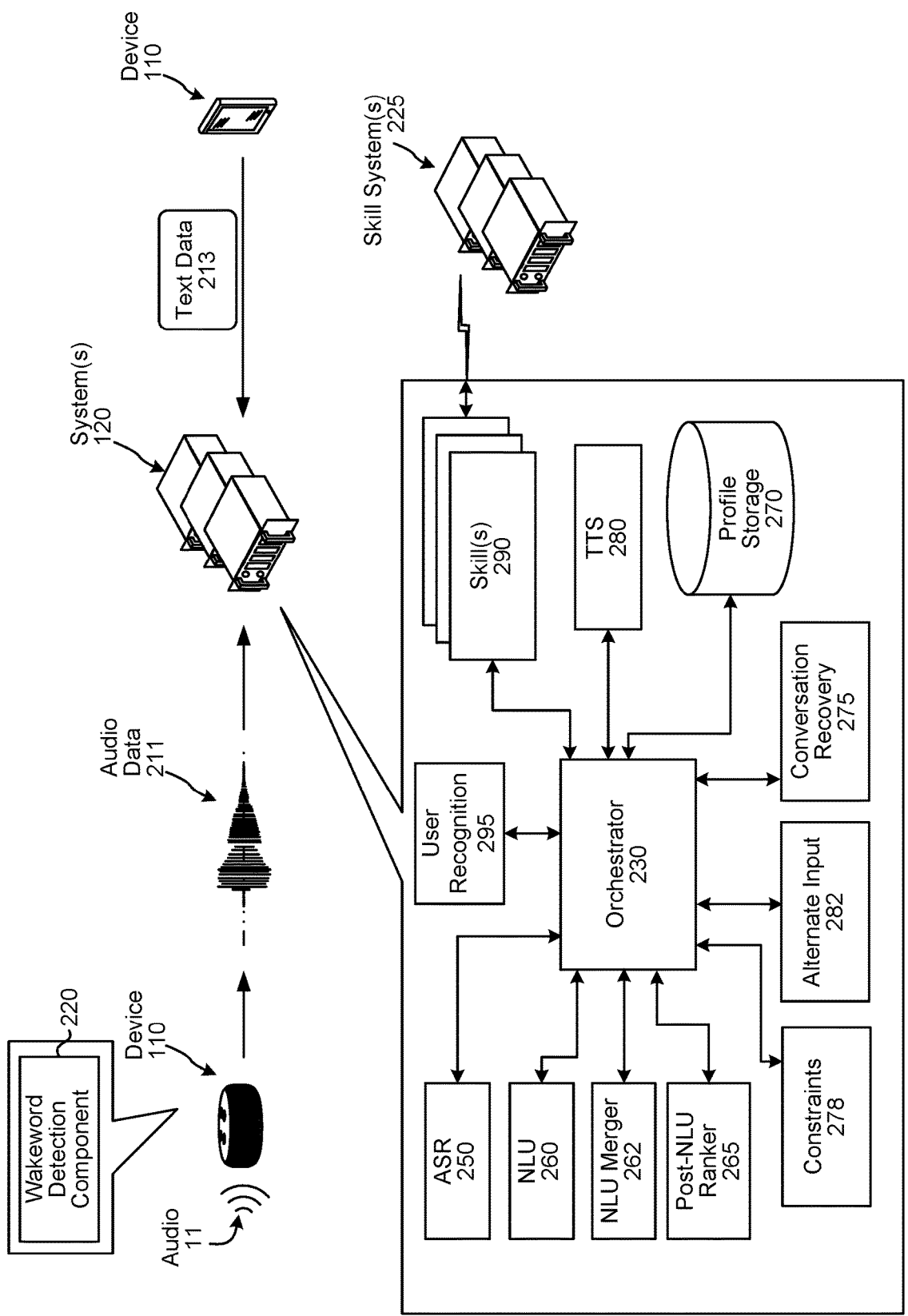
FIG. 2 is a conceptual diagram of components of a spoken language understanding (SLU) system according to embodiments of the present disclosure.

The SLU system may operate using various components as illustrated in FIG. 2. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first SLU processing system for SLU processing and/or command execution. If an utterance includes the wakeword "Ok Google," audio data for that wakeword may be sent to a second SLU processing system for SLU processing and/or command execution. In another example the system may also use different wakewords for different skills within the same SLU processing system. For example, a user may speak "Ford" as a special wakeword to invoke a specific skill or processing pipeline within a first SLU processing system (e.g., a SLU processing system that may otherwise be invoked by speaking "Alexa"). Use of the special "Ford" wakeword may result in different routing of the utterance through the first SLU system than use of a standard wakeword such as "Alexa." Thus the device 110 using the techniques described herein may process incoming audio to determine a first confidence that a detected wakeword is a first wakeword associated with a first SLU processing pipeline (which may be a first SLU processing system or a first pipeline (e.g., skill, etc.) within the first SLU processing system) as well as determine a second confidence that the detected wakeword is a second wakeword associated with a second SLU processing pipeline (which may be a second SLU processing system or a second, different, pipeline (e.g., skill, etc.) within the second SLU processing system. The different systems/pipelines may be associated with different ASR processing, different NLU processing, different commands/intents, or other differences.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to an ASR component 250 that transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The device 110 may send text data 213 to the server(s) 120. Upon receipt by the server(s) 120, the text data 213 may be sent to the orchestrator component 230, which may send the text data 213 to the NLU component 260.

The NLU component 260 receives the ASR hypothesis/ hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A post-NLU ranker 265 may receive NLU results data and determines (as described in detail herein) which skill the system(s) 120 should invoke to execute with respect to the user input. The post-NLU ranker 265 may be implemented separately from the orchestrator component 230 (as illustrated) or one or more components of the post-NLU ranker 265 may be implemented as part of the orchestrator component 230.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system(s) 120 may include a user recognition component 295. In at least some examples, the user recognition component 295 may be implemented as a skill system(s) 125.

The user recognition component 295 may recognize one or more users using various data. The user recognition component 295 may take as input the audio data 211 or other forms of input provided by the user 5. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the system(s) 120 in correlation with a natural language input, to stored biometric data of users. The user recognition component 295 may additionally or alternatively perform user recognition by comparing image data (e.g., including a representation of at least a feature of a user), received by the system(s) 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system(s) 125, as well as processing performed by other components of the system(s) 120 and/or other systems.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The system(s) 120 may include an alternate input component 282 that may be configured to determine one or more alternative representations for the user input, as described in detail below in relation to FIG. 6.

The system(s) 120 may include a NLU merger component 262 (separate from the NLU component 260 or included within the NLU component 260). The NLU merger component 262 may be configured to select or merge NLU hypotheses that are determined using ASR data/hypothesis (or text representing the user input) from different sources. For example, the NLU component 260 may determine a N-best list of NLU hypotheses using the ASR data (including N-best list of ASR hypotheses) determined by the ASR component 250. The alternate input component 282 may determine one or more alternative representations of the user input, including NLU data corresponding to the alternative representations. The NLU merger component 262 may receive the NLU N-best list from the NLU component 260 and NLU data corresponding to the alternative representations from the alternate input component 282. In some embodiments, the NLU merger component 262 may determine to: (1) select the NLU N-best list for further processing; (2) select the NLU data corresponding to the alternative representations; or (3) generate a merged list of NLU hypotheses including at least a portion of the NLU data and at least a portion of the NLU N-best list.

In another embodiment, the NLU component 260 may receive the alternative representations of the user input from the alternate input component 282 and determine a N-best list of NLU hypotheses corresponding to the alternative representations. In this case, the NLU merger component 262 may determine to select the NLU N-best list based on the ASR hypothesis from the ASR component 250, select the NLU N-best list based on the alternative representations, or merge the two NLU N-best list.

The merged NLU N-best list may be determined based on the confidence scores associated with each of the NLU hypotheses. The merged NLU N-best list may include the top one or two NLU hypotheses from each of the NLU N-best list. The merged NLU N-best list may include a tag/indication identifying which component the NLU hypothesis corresponds to. For example, the first NLU hypothesis in the merged NLU N-best list may be tagged with "NLU component" and the second NLU hypothesis in the merged NLU N-best list may be tagged with "alternate input component" or "personalized alternative input" etc.

In some embodiments, the NLU merger component 262 may re-rank the merged NLU N-best list assigning new or updated confidence scores to the NLU hypotheses included in the merged list.

The system(s) 120 may also include a conversation recovery component 275. The conversation recovery component 275 may be configured to perform certain functionalities based on an error type determined by the system(s) 120 to generate the desired result for the user input. For example, the conversation recovery component 275 may determine to confirm with the user certain data/features determined by the ASR component 250 and the NLU component 260.

The system(s) 120 may also include a constraints component 278 that may be configured to enforce certain rules or checks based on system policies and/or user-related data. The constraints component 278 may use feedback received from the user 5 in response to the output responsive to the user input. The constraints component 278 may determine to blacklist certain system-responses to the user 5 based on the user's feedback. The constraints component 278 may determine to blacklist certain system-responses for multiples user based on the user's feedback. The constraints component 278 may determine to blacklist certain system-responses for a period of time (e.g., for the duration of the current dialog session; the next 24 hours; the next week; the next 10 interactions; etc.) for a particular user 5 or for multiple users.

For example, the constraints component 278 may limit the number of times the system(s) 120 engages in a dialog instead of presenting an output responsive to a user input. The constraints component 278 may process user profile data (e.g., user preferences, past user interactions, past dialog sessions, prior turns of the current dialog session, etc.) to determine that the user for the does not want to receive a dialog and would rather have the system perform an action responsive to the user input. For example, the user may have set preferences indicating that in certain situations/contexts (e.g., do-not-disturb mode, during evening/night hours, etc.) the system should not engage in a dialog (such as confirmation or disambiguation) and instead should perform the requested action.

Figure 3:
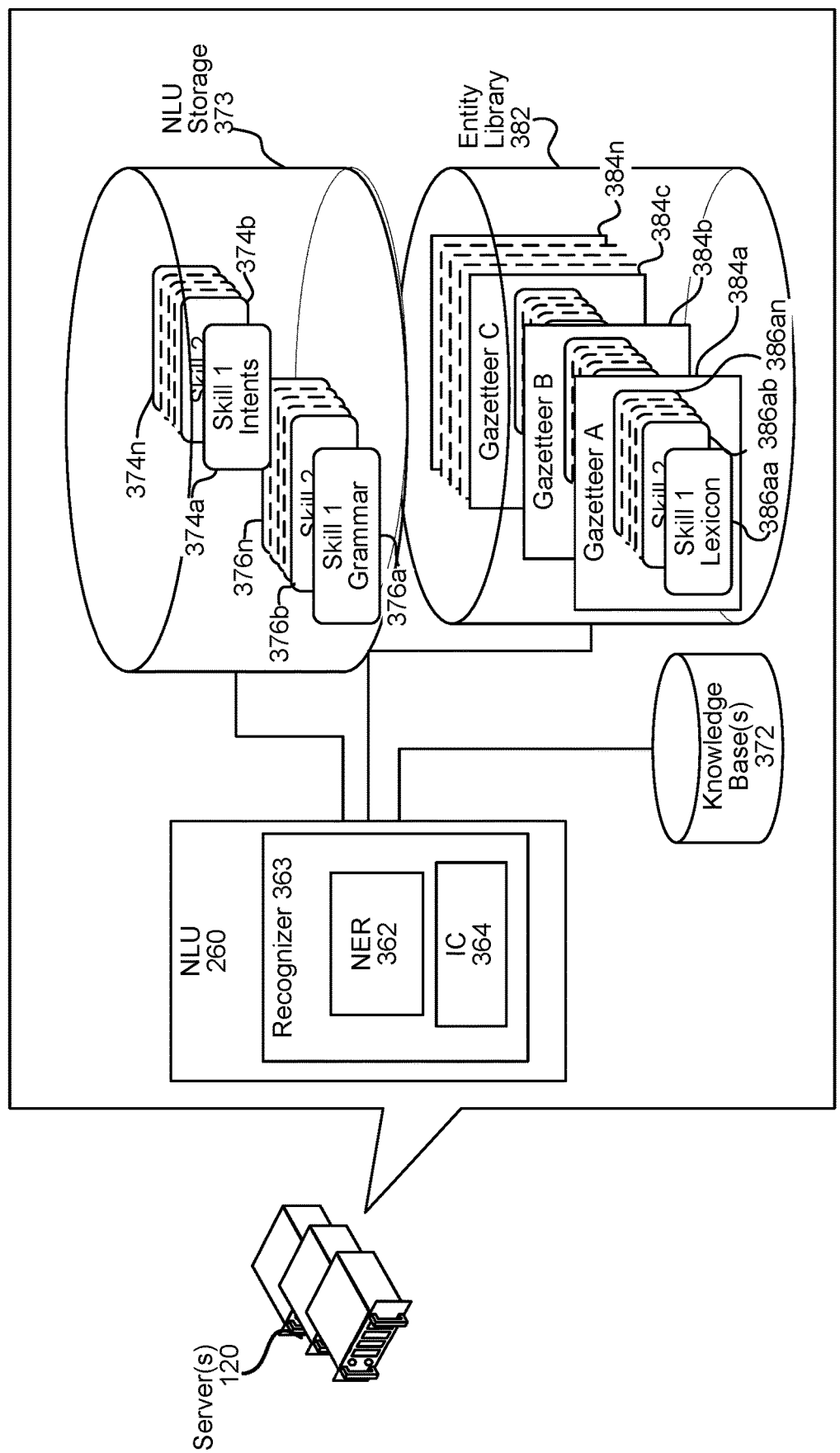
FIG. 3 is a conceptual diagram illustrating how natural language understanding (NLU) processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, skill server(s) 225, etc.) to complete that action.

The NLU component 260 may process text data including several ASR hypotheses. The NLU component 260 may process all (or a portion of) the ASR hypotheses input therein. Even though the ASR component 250 may output multiple ASR hypotheses, the NLU component 260 may be configured to only process with respect to the top scoring ASR hypothesis.

The NLU component 260 may include one or more recognizers 363. Each recognizer 363 may be associated with a different domain (e.g., smart home, video, music, weather, custom, etc.). Each recognizer 363 may process with respect to text data input to the NLU component 260. Each recognizer 363 may operate at least partially in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a domain. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include skill-indexed lexical information associated with a particular user and/or device 110. For example, a Gazetteer A (384a) includes skill-indexed lexical information 386aa to 386an. A user's music skill lexical information might include album titles, artist names, and song names, for example, whereas a user's contact list skill lexical information might include the names of contacts. Since every user's music collection and contact list is presumably different, this personalized information improves entity resolution.

An NER component 362 applies grammar models 376 and lexical information 386 to determine a mention of one or more entities in text data. In this manner, the NER component 362 identifies "slots" (corresponding to one or more particular words in text data) that may be used for later processing. The NER component 362 may also label each slot with a type (e.g., noun, place, city, artist name, song name, etc.).

Each grammar model 376 includes the names of entities (i.e., nouns) commonly found in speech about the particular domain to which the grammar model 376 relates, whereas the lexical information 386 is personalized to the user and/or the device 110 from which the user input originated. For example, a grammar model 376 associated with a shopping domain may include a database of words commonly used when people discuss shopping.

Each recognizer 363 may also include an intent classification (IC) component 364. An IC component 364 parses text data to determine an intent(s). An intent represents an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374.

The intents identifiable by a specific IC component 364 are linked to domain-specific grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (e.g., implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb, which an IC component 364 may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 372). For example, if the text data includes "play songs by the rolling stones," after failing to determine an album name or song name called "songs" by "the rolling stones," the NER component 362 may search the database for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG.

Figure 4:
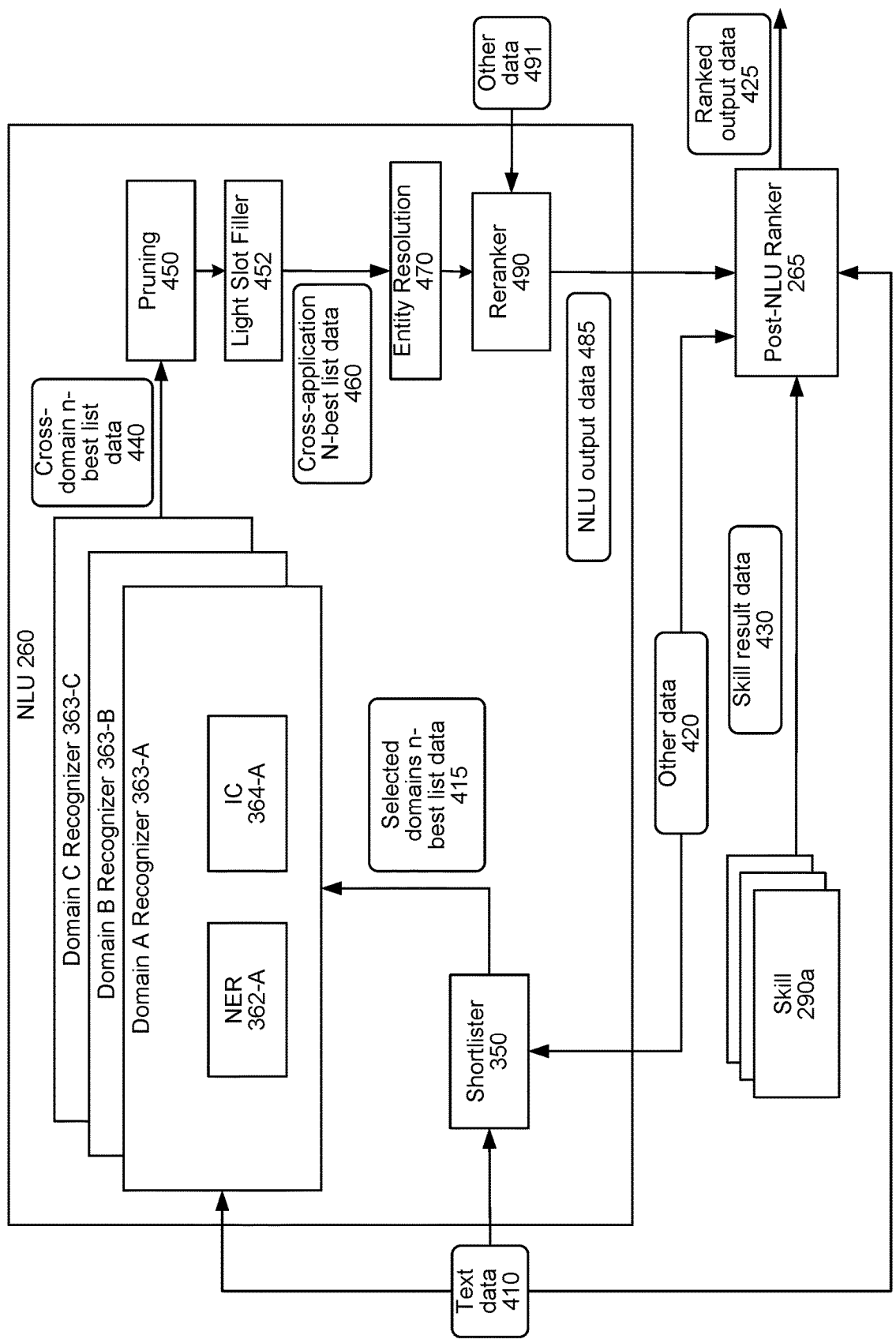
FIG. 4 is a conceptual diagram illustrating how NLU processing may be performed according to embodiments of the present disclosure.

The shortlister component 350 may receive text data 410 output from the ASR component 250 or output from the device 110b (as illustrated in FIG. 4). The ASR component 250 may embed the text data 410 into a form processable by a trained model(s) using sentence embedding techniques as known in the art. Sentence embedding results in the text data 410 including text in a structure that enables the trained models of the shortlister component 450 to operate on the text data 410. For example, an embedding of the text data 410 may be a vector representation of the text data 410.

The shortlister component 350 may make binary determinations (e.g., yes or no) regarding which domains relate to the text data 410. The shortlister component 350 may make such determinations using the one or more trained models described herein above. If the shortlister component 350 implements a single trained model for each domain, the shortlister component 350 may simply run the models that are associated with enabled domains as indicated in a user profile associated with the device 110 and/or user that originated the user input.

The shortlister component 350 may generate n-best list data 415 representing domains that may execute with respect to the user input represented in the text data 410. The size of the n-best list represented in the n-best list data 415 is configurable. In an example, the n-best list data 415 may indicate every domain of the system as well as contain an indication, for each domain, regarding whether the domain is likely capable to execute the user input represented in the text data 410. In another example, instead of indicating every domain of the system, the n-best list data 415 may only indicate the domains that are likely to be able to execute the user input represented in the text data 410. In yet another example, the shortlister component 350 may implement thresholding such that the n-best list data 415 may indicate no more than a maximum number of domains that may execute the user input represented in the text data 410. In an example, the threshold number of domains that may be represented in the n-best list data 415 is ten. In another example, the domains included in the n-best list data 415 may be limited by a threshold a score, where only domains indicating a likelihood to handle the user input is above a certain score (as determined by processing the text data 410 by the shortlister component 350 relative to such domains) are included in the n-best list data 415.

The text data 410 may correspond to more than one ASR hypothesis. When this occurs, the shortlister component 350 may output a different n-best list (represented in the n-best list data 415) for each ASR hypothesis. Alternatively, the shortlister component 350 may output a single n-best list representing the domains that are related to the multiple ASR hypotheses represented in the text data 410.

As indicated above, the shortlister component 350 may implement thresholding such that an n-best list output therefrom may include no more than a threshold number of entries. If the text data 410 includes more than one ASR hypothesis, the n-best list output by the shortlister component 350 may include no more than a threshold number of entries irrespective of the number of ASR hypotheses output by the ASR component 250. Alternatively or in addition, the n-best list output by the shortlister component 350 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the text data 410, the shortlister component 350 may generate confidence scores representing likelihoods that domains relate to the text data 410. If the shortlister component 350 implements a different trained model for each domain, the shortlister component 350 may generate a different confidence score for each individual domain trained model that is run. If the shortlister component 350 runs the models of every domain when text data 410 is received, the shortlister component 350 may generate a different confidence score for each domain of the system. If the shortlister component 350 runs the models of only the domains that are associated with skills indicated as enabled in a user profile associated with the device 110 and/or user that originated the user input, the shortlister component 350 may only generate a different confidence score for each domain associated with at least one enabled skill. If the shortlister component 350 implements a single trained model with domain specifically trained portions, the shortlister component 350 may generate a different confidence score for each domain who's specifically trained portion is run. The shortlister component 350 may perform matrix vector modification to obtain confidence scores for all domains of the system in a single instance of processing of the text data 410.

N-best list data 415 including confidence scores that may be output by the shortlister component 350 may be represented as, for example:

Search domain, 0.67
Recipe domain, 0.62
Information domain, 0.57
Shopping domain, 0.42

As indicated, the confidence scores output by the shortlister component 350 may be numeric values. The confidence scores output by the shortlister component 350 may alternatively be binned values (e.g., high, medium, low).

The n-best list may only include entries for domains having a confidence score satisfying (e.g., equaling or exceeding) a minimum threshold confidence score. Alternatively, the shortlister component 350 may include entries for all domains associated with user enabled skills, even if one or more of the domains are associated with confidence scores that do not satisfy the minimum threshold confidence score.

The shortlister component 350 may consider other data 420 when determining which domains may relate to the user input represented in the text data 410 as well as respective confidence scores. The other data 420 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 420 may include an indicator of the user associated with the text data 410, for example as determined by the user recognition component 295.

The other data 420 may be character embedded prior to being input to the shortlister component 350. The other data 420 may alternatively be embedded using other techniques known in the art prior to being input to the shortlister component 350.

The other data 420 may also include data indicating the domains associated with skills that are enabled with respect to the device 110 and/or user that originated the user input. The shortlister component 350 may use such data to determine which domain-specific trained models to run. That is, the shortlister component 350 may determine to only run the trained models associated with domains that are associated with user-enabled skills. The shortlister component 350 may alternatively use such data to alter confidence scores of domains.

As an example, considering two domains, a first domain associated with at least one enabled skill and a second domain not associated with any user-enabled skills of the user that originated the user input, the shortlister component 350 may run a first model specific to the first domain as well as a second model specific to the second domain. Alternatively, the shortlister component 350 may run a model configured to determine a score for each of the first and second domains. The shortlister component 350 may determine a same confidence score for each of the first and second domains in the first instance. The shortlister component 350 may then alter those confidence scores based on which domains is associated with at least one skill enabled by the present user. For example, the shortlister component 350 may increase the confidence score associated with the domain associated with at least one enabled skill while leaving the confidence score associated with the other domain the same. Alternatively, the shortlister component 350 may leave the confidence score associated with the domain associated with at least one enabled skill the same while decreasing the confidence score associated with the other domain. Moreover, the shortlister component 350 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 350 receives the text data 410, the shortlister component 350 may determine whether profile data associated with the user and/or device 110 that originated the command includes an indication of enabled skills.

The other data 420 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 350 may use such data to determine which domain-specific trained models to run. For example, if the device 110 corresponds to a displayless type device, the shortlister component 350 may determine not to run trained models specific to domains that output video data. The shortlister component 350 may alternatively use such data to alter confidence scores of domains.

As an example, considering two domains, one that outputs audio data and another that outputs video data, the shortlister component 350 may run a first model specific to the domain that generates audio data as well as a second model specific to the domain that generates video data. Alternatively the shortlister component 350 may run a model configured to determine a score for each domain. The shortlister component 350 may determine a same confidence score for each of the domains in the first instance. The shortlister component 350 may then alter the original confidence scores based on the type of the device 110 that originated the user input corresponding to the text data 410. For example, if the device 110 is a displayless device, the shortlister component 350 may increase the confidence score associated with the domain that generates audio data while leaving the confidence score associated with the domain that generates video data the same. Alternatively, if the device 110 is a displayless device, the shortlister component 350 may leave the confidence score associated with the domain that generates audio data the same while decreasing the confidence score associated with the domain that generates video data. Moreover, if the device 110 is a displayless device, the shortlister component 350 may increase the confidence score associated with the domain that generates audio data as well as decrease the confidence score associated with the domain that generates video data.

The type of device information represented in the other data 420 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 420 may represent the smart TV of other display device, and not the displayless device that captured the spoken user input.

The other data 420 may also include data indicating the user input originating device's speed, location, or other mobility information. For example, the device may correspond to a vehicle including a display. If the vehicle is moving, the shortlister component 350 may decrease the confidence score associated with a domain that generates video data as it may be undesirable to output video content to a user while the user is driving. The device may output data to the system(s) 120 indicating when the device is moving.

The other data 420 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 350 may use such data to alter confidence scores of domains. For example, the shortlister component 350 may run a first model specific to a first domain as well as a second model specific to a second domain. Alternatively, the shortlister component 350 may run a model configured to determine a score for each domain. The shortlister component 350 may also determine a same confidence score for each of the domains in the first instance. The shortlister component 350 may then alter the original confidence scores based on the first domain being invoked to cause the system to output content while the current user input was received. Based on the first domain being invoked, the shortlister component 350 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 415 generated by the shortlister component 350 as well as the different types of other data 420 considered by the shortlister component 350 are configurable. For example, the shortlister component 350 may update confidence scores as more other data 420 is considered. For further example, the n-best list data 415 may exclude relevant domains if thresholding is implemented. Thus, for example, the shortlister component 350 may include an indication of a domain in the n-best list 415 unless the shortlister component 350 is one hundred percent confident that the domain may not execute the user input represented in the text data 410 (e.g., the shortlister component 350 determines a confidence score of zero for the domain).

The shortlister component 350 may send the text data 410 to recognizers 363 associated with domains represented in the n-best list data 415. Alternatively, the shortlister component 350 may send the n-best list data 415 or some other indicator of the selected subset of domains to another component (such as the orchestrator component 230) which may in turn send the text data 410 to the recognizers 363 corresponding to the domains included in the n-best list data 415 or otherwise indicated in the indicator. If the shortlister component 350 generates an n-best list representing domains without any associated confidence scores, the shortlister component 350/orchestrator component 230 may send the text data 410 to recognizers 363 associated with domains that the shortlister component 350 determines may execute the user input. If the shortlister component 350 generates an n-best list representing domains with associated confidence scores, the shortlister component 350/orchestrator component 230 may send the text data 410 to recognizers 363 associated with domains associated with confidence scores satisfying (e.g., meeting or exceeding) a threshold minimum confidence score.

A recognizer 363 may output tagged text data generated by an NER component 362 and an IC component 364, as described herein above. The NLU component 260 may compile the output tagged text data of the recognizers 363 into a single cross-domain n-best list 440 and may send the cross-domain n-best list 440 to a pruning component 450. Each entry of tagged text (e.g., each NLU hypothesis) represented in the cross-domain n-best list data 440 may be associated with a respective score indicating a likelihood that the NLU hypothesis corresponds to the domain associated with the recognizer 363 from which the NLU hypothesis was output. For example, the cross-domain n-best list data 440 may be represented as (with each line corresponding to a different NLU hypothesis):

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 450 may sort the NLU hypotheses represented in the cross-domain n-best list data 440 according to their respective scores. The pruning component 450 may perform score thresholding with respect to the cross-domain NLU hypotheses. For example, the pruning component 450 may select NLU hypotheses associated with scores satisfying (e.g., meeting and/or exceeding) a threshold score. The pruning component 450 may also or alternatively perform number of NLU hypothesis thresholding. For example, the pruning component 450 may select the top scoring NLU hypothesis(es). The pruning component 450 may output a portion of the NLU hypotheses input thereto. The purpose of the pruning component 450 is to create a reduced list of NLU hypotheses so that downstream, more resource intensive, processes may only operate on the NLU hypotheses that most likely represent the user's intent.

The NLU component 260 may include a light slot filler component 452. The light slot filler component 452 can take text from slots represented in the NLU hypotheses output by the pruning component 450 and alter them to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-domain n-best list data 460.

The cross-domain n-best list data 460 may be input to an entity resolution component 470. The entity resolution component 470 can apply rules or other instructions to standardize labels or tokens from previous stages into an intent/slot representation. The precise transformation may depend on the domain. For example, for a travel domain, the entity resolution component 470 may transform text corresponding to "Boston airport" to the standard BOS three-letter code referring to the airport. The entity resolution component 470 can refer to a knowledge base that is used to specifically identify the precise entity referred to in each slot of each NLU hypothesis represented in the cross-domain n-best list data 460. Specific intent/slot combinations may also be tied to a particular source, which may then be used to resolve the text. In the example "play songs by the stones," the entity resolution component 470 may reference a personal music catalog, Amazon Music account, a user profile, or the like. The entity resolution component 470 may output an altered n-best list that is based on the cross-domain n-best list 460 but that includes more detailed information (e.g., entity IDs) about the specific entities mentioned in the slots and/or more detailed slot data that can eventually be used by a skill. The NLU component 260 may include multiple entity resolution components 470 and each entity resolution component 470 may be specific to one or more domains.

The NLU component 260 may include a reranker 490. The reranker 490 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 470.

The reranker 490 may apply re-scoring, biasing, or other techniques. The reranker 490 may consider not only the data output by the entity resolution component 470, but may also consider other data 491. The other data 491 may include a variety of information. For example, the other data 491 may include skill rating or popularity data. For example, if one skill has a high rating, the reranker 490 may increase the score of a NLU hypothesis that may be processed by the skill. The other data 491 may also include information about skills that have been enabled by the user that originated the user input. For example, the reranker 490 may assign higher scores to NLU hypothesis that may be processed by enabled skills than NLU hypothesis that may be processed by non-enabled skills. The other data 491 may also include data indicating user usage history, such as if the user that originated the user input regularly uses a particular skill or does so at particular times of day. The other data 491 may additionally include data indicating date, time, location, weather, type of device 110, user identifier, context, as well as other information. For example, the reranker 490 may consider when any particular skill is currently active (e.g., music being played, a game being played, etc.).

As illustrated and described, the entity resolution component 470 is implemented prior to the reranker 490. The entity resolution component 470 may alternatively be implemented after the reranker 490. Implementing the entity resolution component 470 after the reranker 490 limits the NLU hypotheses processed by the entity resolution component 470 to only those hypotheses that successfully pass through the reranker 490.

The reranker 490 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2). The NLU component 260 may separately perform NLU processing described above with respect to domains associated with skills that are at least partially implemented as part of the skill system(s) 125. In an example, the shortlister component 350 may only process with respect to these latter domains. Results of these two NLU processing paths may be merged into NLU output data 485, which may be sent to a post-NLU ranker 265, which may be implemented by the system(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 485, skill result data 430, and the other data 420 in order to output ranked output data 425. The ranked output data 425 may include an n-best list where the NLU hypotheses in the NLU results data 485 are reordered such that the n-best list in the ranked output data 425 represents a prioritized list of skills to respond to a user input as determined by the post-NLU ranker 265. The ranked output data 425 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 485 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 430 based on the first NLU hypothesis and the second NLU hypothesis, respectively. For example, the post-NLU ranker 265 may send the first NLU hypothesis to the first skill 290a along with a request for the first skill 290a to at least partially execute with respect to the first NLU hypothesis. The post-NLU ranker 265 may also send the second NLU hypothesis to the second skill 290b along with a request for the second skill 290b to at least partially execute with respect to the second NLU hypothesis. The post-NLU ranker 265 receives, from the first skill 290a, first result data 430a generated from the first skill 290a's execution with respect to the first NLU hypothesis. The post-NLU ranker 265 also receives, from the second skill 290b, second results data 430b generated from the second skill 290b's execution with respect to the second NLU hypothesis.

The result data 430 may include various portions. For example, the result data 430 may include content (e.g., audio data, text data, and/or video data) to be output to a user. The result data 430 may also include a unique identifier used by the system(s) 120 and/or the skill system(s) 125 to locate the data to be output to a user. The result data 430 may also include an instruction. For example, if the user input corresponds to "turn on the light," the result data 430 may include an instruction causing the system to turn on a light associated with a profile of the device (110a/110b) and/or user.

The post-NLU ranker 265 may consider the first result data 430a and the second result data 430b to alter the first confidence score and the second confidence score of the first NLU hypothesis and the second NLU hypothesis, respectively. That is, the post-NLU ranker 265 may generate a third confidence score based on the first result data 430a and the first confidence score. The third confidence score may correspond to how likely the post-NLU ranker 265 determines the first skill will correctly respond to the user input. The post-NLU ranker 265 may also generate a fourth confidence score based on the second result data 430b and the second confidence score. One skilled in the art will appreciate that a first difference between the third confidence score and the fourth confidence score may be greater than a second difference between the first confidence score and the second confidence score. The post-NLU ranker 265 may also consider the other data 420 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 430 associated with the skill 290 with the highest altered confidence score to be the data output in response to the current user input. The post-NLU ranker 265 may also consider the text data 410 to alter the NLU hypotheses confidence scores.

The orchestrator component 230 may, prior to sending the NLU results data 485 to the post-NLU ranker 265, associate intents in the NLU hypotheses with skills 290. For example, if a NLU hypothesis includes a <PlayMusic> intent, the orchestrator component 230 may associate the NLU hypothesis with one or more skills 290 that can execute the <PlayMusic> intent. Thus, the orchestrator component 230 may send the NLU results data 485, including NLU hypotheses paired with skills 290, to the post-NLU ranker 265. In response to text data 410 corresponding to "what should I do for dinner today," the orchestrator component 230 may generates pairs of skills 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill 290, paired with a NLU hypothesis in the NLU output data 485, to provide result data 430 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 430. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 430 indicating slots of a framework that the skill 290 further needs filled or entities that the skill 290 further needs resolved prior to the skill 290 being able to provided result data 430 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 430 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 430 provided by the skills 290 to alter the NLU processing confidence scores generated by the reranker 490. That is, the post-NLU ranker 265 uses the result data 430 provided by the queried skills 290 to create larger differences between the NLU processing confidence scores generated by the reranker 490. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 430 responsive to NLU hypotheses over skills 290 that provide result data 430 corresponding to an indication that further information is needed, as well as skills 290 that provide result data 430 indicating they can provide multiple responses to received NLU hypotheses. For example, the post-NLU ranker 265 may generate a first score for a first skill 290a that is greater than the first skill's NLU confidence score based on the first skill 290a providing result data 230a including a response to a NLU hypothesis. For further example, the post-NLU ranker 265 may generate a second score for a second skill 290b that is less than the second skill's NLU confidence score based on the second skill 290b providing result data 430b indicating further information is needed for the second skill 290b to provide a response to a NLU hypothesis. Yet further, for example, the post-NLU ranker 265 may generate a third score for a third skill 290c that is less than the third skill's NLU confidence score based on the third skill 290c providing result data 430c indicating the third skill 290c can provide multiple responses to a NLU hypothesis.

The post-NLU ranker 265 may consider other data 420 in determining scores. The other data 420 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290a that is greater than the first skill's NLU processing confidence score based on the first skill 290a being associated with a high ranking. For further example, the post-NLU ranker 265 may generate a second score for a second skill 290b that is less than the second skill's NLU processing confidence score based on the second skill 290b being associated with a low ranking.

The other data 420 may include information indicating whether or not the user that originated the user input has enabled one or more of the queried skills 290. For example, the post-NLU ranker 265 may generate a first score for a first skill 290a that is greater than the first skill's NLU processing confidence score based on the first skill 290a being enabled by the user that originated the user input. For further example, the post-NLU ranker 265 may generate a second score for a second skill 290b that is less than the second skill's NLU processing confidence score based on the second skill 290b not being enabled by the user that originated the user input. When the post-NLU ranker 265 receives the NLU results data 485, the post-NLU ranker 265 may determine whether profile data, associated with the user and/or device that originated the user input, includes indications of enabled skills.

The other data 420 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 420 may include information indicating the veracity of the result data 430 provided by a skill 290. For example, if a user says "tell me a recipe for pasta sauce," a first skill 290a may provide the post-NLU ranker 265 with first result data 430a corresponding to a first recipe associated with a five star rating and a second skill 290b may provide the post-NLU ranker 265 with second result data 430b corresponding to a second recipe associated with a one star rating. In this situation, the post-NLU ranker 265 may increase the NLU processing confidence score associated with the first skill 290a based on the first skill 290a providing the first result data 430a associated with the five star rating and/or decrease the NLU processing confidence score associated with the second skill 290b based on the second skill 290b providing the second result data 430b associated with the one star rating.

The other data 420 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290a corresponding to a room service skill associated with the hotel and/or decrease the NLU processing confidence score associated with a second skill 290b corresponding to a food skill not associated with the hotel.

The other data 420 may include information indicating a location of the device and/or user that originated the user input. The system may be configured with skills 290 that may only operate with respect to certain geographic locations. For example, a user may provide a user input corresponding to "when is the next train to Portland." A first skill 290a may operate with respect to trains that arrive at, depart from, and pass through Portland, Oregon. A second skill 290b may operate with respect to trains that arrive at, depart from, and pass through Portland, Maine. If the device and/or user that originated the user input is located in Seattle, Washington, the post-NLU ranker 265 may increase the NLU processing confidence score associated with the first skill 290a and/or decrease the NLU processing confidence score associated with the second skill 290b. Likewise, if the device and/or user that originated the user input is located in Boston, Massachusetts, the post-NLU ranker 265 may increase the NLU processing confidence score associated with the second skill 290b and/or decrease the NLU processing confidence score associated with the first skill 290a.

The other data 420 may include information indicating a time of day. The system may be configured with skills 290 that operate with respect to certain times of day. For example, a user may provide a user input corresponding to "order me food." A first skill 290a may generate first result data 430a corresponding to breakfast. A second skill 290b may generate second result data 430b corresponding to dinner. If the system(s) 120 receives the user input in the morning, the post-NLU ranker 265 may increase the NLU processing confidence score associated with the first skill 290a and/or decrease the NLU processing score associated with the second skill 290b. If the system(s) 120 receives the user input in the afternoon or evening, the post-NLU ranker 265 may increase the NLU processing confidence score associated with the second skill 290b and/or decrease the NLU processing confidence score associated with the first skill 290a.

The other data 420 may include information indicating user preferences. The system may include multiple skills 290 configured to execute in substantially the same manner. For example, a first skill 290a and a second skill 290b may both be configured to order food from respective restaurants. The system may store a user preference (e.g., in the profile storage 270) that is associated with the user that provided the user input to the system(s) 120 as well as indicates the user prefers the first skill 290a over the second skill 290b. Thus, when the user provides a user input that may be executed by both the first skill 290a and the second skill 290b, the post-NLU ranker 265 may increase the NLU processing confidence score associated with the first skill 290a and/or decrease the NLU processing confidence score associated with the second skill 290b.

The other data 420 may include information indicating system usage history associated with the user that originated the user input. For example, the system usage history may indicate the user originates user inputs that invoke a first skill 290a more often than the user originates user inputs that invoke a second skill 290b. Based on this, if the present user input may be executed by both the first skill 290a and the second skill 290b, the post-NLU ranker 265 may increase the NLU processing confidence score associated with the first skill 290a and/or decrease the NLU processing confidence score associated with the second skill 290b.

The other data 420 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290a that generates audio data. The post-NLU ranker 265 may also or alternatively decrease the NLU processing confidence score associated with a second skill 290b that generates image data or video data.

The other data 420 may include information indicating how long it took a skill 290 to provide result data 430 to the post-NLU ranker 265. When the post-NLU ranker 265 multiple skills 290 for result data 430, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 420 to increase and decrease NLU processing confidence scores associated with various skills 290 that the post-NLU ranker 265 has already requested result data from. Alternatively, the post-NLU ranker 265 may use the other data 420 to determine which skills 290 to request result data from. For example, the post-NLU ranker 265 may use the other data 420 to increase and/or decrease NLU processing confidence scores associated with skills 290 associated with the NLU results data 485 output by the NLU component 260. The post-NLU ranker 265 may select n-number of top scoring altered NLU processing confidence scores. The post-NLU ranker 265 may then request result data 430 from only the skills 290 associated with the selected n-number of NLU processing confidence scores.

As described, the post-NLU ranker 265 may request result data 430 from all skills 290 associated with the NLU results data 485 output by the NLU component 260. Alternatively, the system(s) 120 may prefer result data 430 from skills implemented entirely by the system(s) 120 rather than skills at least partially implemented by the skill system(s) 125. Therefore, in the first instance, the post-NLU ranker 265 may request result data 430 from only skills associated with the NLU results data 485 and entirely implemented by the system(s) 120. The post-NLU ranker 265 may only request result data 430 from skills associated with the NLU results data 485, and at least partially implemented by the skill system(s) 125, if none of the skills, wholly implemented by the system(s) 120, provide the post-NLU ranker 265 with result data 430 indicating either data response to the NLU results data 485, an indication that the skill can execute the user input, or an indication that further information is needed.

As indicated above, the post-NLU ranker 265 may request result data 430 from multiple skills 290. If one of the skills 290 provides result data 430 indicating a response to a NLU hypothesis and the other skills provide result data 430 indicating either they cannot execute or they need further information, the post-NLU ranker 265 may select the result data 430 including the response to the NLU hypothesis as the data to be output to the user. If more than one of the skills 290 provides result data 430 indicating responses to NLU hypotheses, the post-NLU ranker 265 may consider the other data 420 to generate altered NLU processing confidence scores, and select the result data 430 of the skill associated with the greatest score as the data to be output to the user.

A system that does not implement the post-NLU ranker 265 may select the highest scored NLU hypothesis in the NLU results data 485. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 485 to provide result data 430 to the post-NLU ranker 265 prior to the post-NLU ranker 265 ultimately determining the skill 290 to be invoked to respond to the user input. Some of the skills 290 may provide result data 430 indicating responses to NLU hypotheses while other skills 290 may providing result data 430 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 430, associated with the skill 290 associated with the highest score, for output to the user. Alternatively, the post-NLU ranker 265 may output ranked output data 425 indicating skills 290 and their respective post-NLU ranker rankings. Since the post-NLU ranker 265 receives result data 430, potentially corresponding to a response to the user input, from the skills 290 prior to post-NLU ranker 265 selecting one of the skills or outputting the ranked output data 425, little to no latency occurs from the time skills provide result data 430 and the time the system outputs responds to the user.

If the post-NLU ranker 265 selects result audio data to be output to a user and the system determines content should be output audibly, the post-NLU ranker 265 (or another component of the system(s) 120) may cause the device 110*a* and/or the device 110*b* to output audio corresponding to the result audio data. If the post-NLU ranker 265 selects result text data to output to a user and the system determines content should be output visually, the post-NLU ranker 265 (or another component of the system(s) 120) may cause the device 110*b* to display text corresponding to the result text data. If the post-NLU ranker 265 selects result audio data to output to a user and the system determines content should be output visually, the post-NLU ranker 265 (or another component of the system(s) 120) may send the result audio data to the ASR component 250. The ASR component 250 may generate output text data corresponding to the result audio data. The system(s) 120 may then cause the device 110*b* to display text corresponding to the output text data. If the post-NLU ranker 265 selects result text data to output to a user and the system determines content should be output audibly, the post-NLU ranker 265 (or another component of the system(s) 120) may send the result text data to the TTS component 280. The TTS component 280 may generate output audio data (corresponding to computer-generated speech) based on the result text data. The system(s) 120 may then cause the device 110*a* and/or the device 110*b* to output audio corresponding to the output audio data.

As described, a skill 290 may provide result data 430 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 430 indicating a response to the user input, the post-NLU ranker 265 (or another component of the system(s) 120, such as the orchestrator component 230) may simply cause content corresponding to the result data 430 to be output to the user. For example, the post-NLU ranker 265 may send the result data 430 to the orchestrator component 230. The orchestrator component 230 may cause the result data 430 to be sent to the device (110*a*/110*b*), which may output audio and/or display text corresponding to the result data 430. The orchestrator component 230 may send the result data 430 to the ASR component 250 to generate output text data and/or may send the result data 430 to the TTS component 280 to generate output audio data, depending on the situation.

The skill 290 associated with the highest post-NLU ranker score may provide the post-NLU ranker 265 with result data 430 indicating more information is needed as well as instruction data. The instruction data may indicate how the skill 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110*a*/110*b*). When this occurs, the post-NLU ranker 265 may simply cause the received instruction data be output by the device (110*a*/110*b*). Alternatively, the instruction data may be in a format that is not capable of being output by the device (110*a*/110*b*). When this occurs, the post-NLU ranker 265 may cause the ASR component 250 or the TTS component 280 to process the instruction data, depending on the situation, to generate instruction data that may be output by the device (110*a*/110*b*). Once the user provides the system with all further information needed by the skill 290, the skill 290 may provide the system with result data 430 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 430 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 430, the system may further engage a transactional skill 290 after the transactional skill 290 provides the post-NLU ranker 265 with result data 430 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 5:
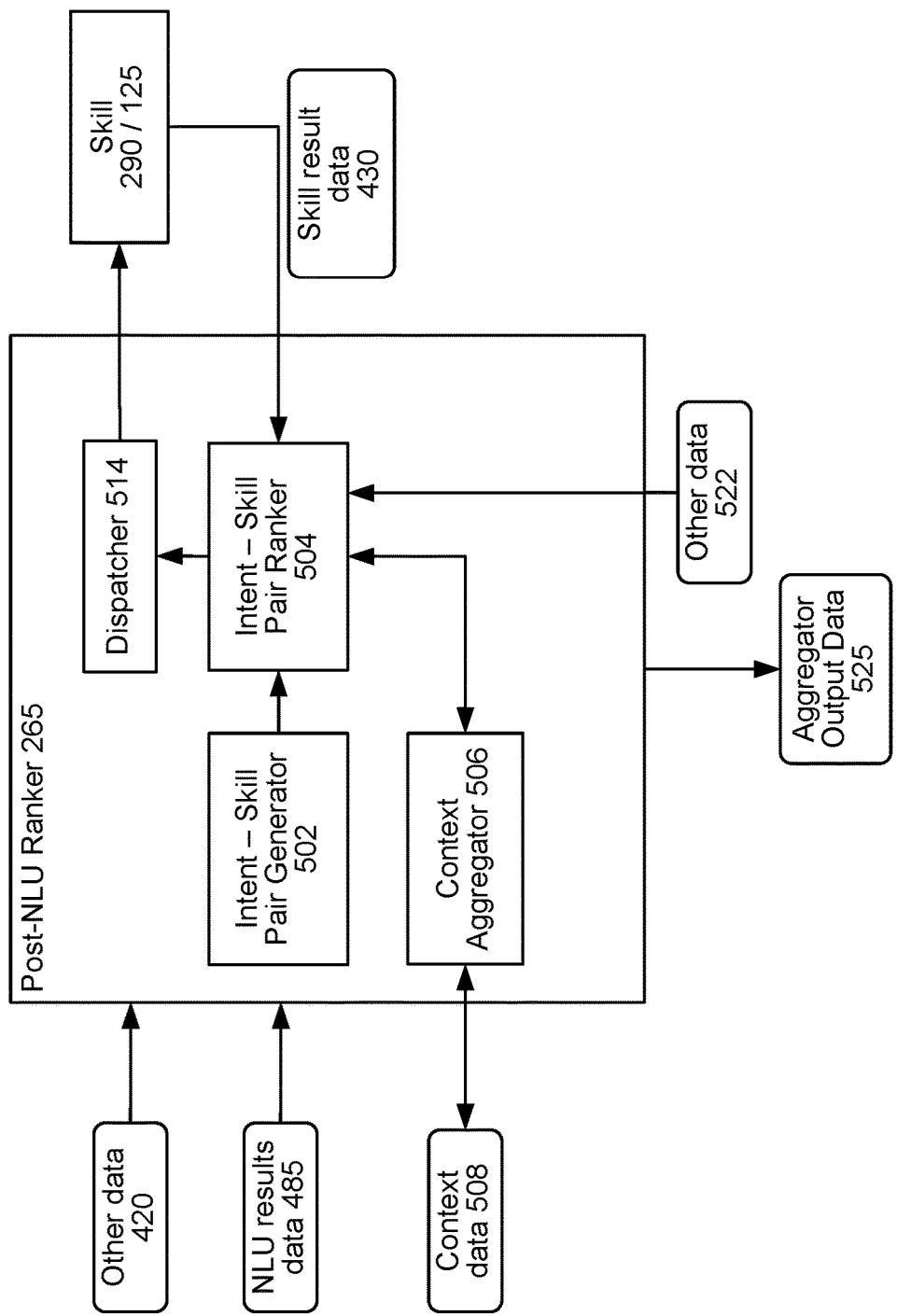
FIG. 5 is a conceptual diagram illustrating how a post-NLU ranker may process data according to embodiments of the present disclosure.

FIG. 5 illustrates other configurations and operations of the post-NLU ranker 265. When the post-NLU ranker 265 receives NLU results data 485, the NLU results data 485 may be sent to an intent-skill pair generator 502. The intent-skill pair generator 502 may include information about what skills are capable of handling what intents. Such information may be context agnostic, and may thus indicate what skills are capable of handling what intents generally, without regard to the context associated with the user input. The intent-skill pair generator 502 thus receives the NLU results data 485 and identifies what particular candidate skills may handle the intent for NLU hypothesis. For example, if a NLU hypothesis includes a particular intent, the intent-skill pair generator 502 identifies each skill that may execute with respect to the intent. For further example, if the NLU results data 485 include multiple NLU hypotheses including multiple intents, the intent-skill pair generator 502 associates each different NLU hypothesis with each skill that may execute with respect to the NLU hypothesis. As illustrated, the intent-skill pair generator 502 may be implemented at part of the post-NLU ranker 265. However, one skill in the art will appreciate that the intent-skill pair generator 502 may be implemented as part of the NLU component 260 or in another component without departing from the present disclosure. In such a case, the NLU results data 485 may include intent-skill pairs.

The post-NLU ranker 265 may also include an intent-skill pair ranker 504. The intent-skill pair ranker 504 ranks the intent-skill pairs generated by the intent-skill pair generator 502 based on, for example, the number of filled slots of a NLU hypothesis, an NLU confidence score associated with a NLU hypothesis, context information output by a context aggregator 506, and/or other data.

The post-NLU ranker 265 may include the context aggregator 506. The context aggregator 506 receives context data 508 from various contextual sources. The context data 508 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 506 may aggregate the context data 508 and put the context data 508 in a form that can be processed by the intent-skill pair ranker 504. Context data 508 may include data obtained from the device 110 or from other services connected to the system(s) 120.

The context data 508 may include skill availability data. Such information may indicate what skills are available and authorized to process the user input. For example, if the user has only enabled certain skills, the enabled skills may be noted in the skill availability data.

The context data 508 may also include dialog data. A "dialog" or "dialog session" as used herein may refer to data transmissions (such as relating to multiple user inputs and system(s) 120 outputs) between the system(s) 120 and a local device (e.g., the device 110) that all relate to a single originating user input. Thus, the data transmissions of a dialog session may share a dialog identifier or other unique identifier that may be used by the orchestrator component 230, skill(s) 290, skill server(s) 125, etc. to track information across the dialog session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialog session related to the originating user input "play jeopardy." In some examples, a dialog-initiating user input may start with a wakeword and end with a command, such as "Alexa, play jeopardy," where "Alexa" is the wakeword and "play jeopardy" is the command. Subsequent user inputs of the same dialog session may or may not start with speaking of a wakeword. Each user input of a dialog may be associated with a unique user input identifier such that multiple user input identifiers may be associated with a single dialog session identifier.

Dialog data may include interactive focus information, (e.g., representing which skill was most recently invoked to execute a previous user input for the user and/or device 110 associated with the present user input). Dialog data may also include content focus information (e.g., representing a skill that is streaming data to the device 110 when the data corresponding to the current user input is received by the system(s) 120). The context data 508 may be one portion of the data used by the intent-skill pair ranker 504 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 508 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 508 (and/or other data 522) may include a metadata flag/indicator that represents whether the particular skill being executed is one that can handle a go-back (or other navigational) request.

The context data 508 may also include user profile data. The user profile data may represent preferences and/or characteristics of the user that originated the current user input. Such data may be received from the profile storage 270.

The context data 508 may also include location data. The location data may represent a location of the device 110 from which the user input was received.

The context data 508 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

The context data 508 may also include data regarding whether one or more skills are "in focus." A skill may be in interactive focus, meaning the skill was the most recent skill that executed a user input for a user or device associated with a present user input and/or the skill may be involved with an open dialog (e.g., series of user inputs and responses) with a user device. Interactive focus attempts to continue a conversation between a user and the system and/or a skill for purposes of processing the dialog. However, there may be instances where a user inputs a command that may be handled by a skill that is currently in interactive focus, but which the user does not intend to be executed by such skill. The system may process the context data 508 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 508 may also include other context data not explicitly recited herein.

The intent-skill pair ranker 504 may operate one or more trained models that are configured to process the NLU results data 485, skill result data 430, and other data 522 in order to determine a single best skill for executing the current user input from the available pairs output by the intent-skill pair generator 502. The intent-skill pair ranker 504 may send queries to the skills and request a first skill and a second skill (for example the candidate skills identified by the pair generator 502), to provide potential result data indicating whether the skill can handle the intent at the particular moment and if so, what the output data for the particular skill would be (e.g., data the skill would provide to a user if the skill were selected to execute the user input) based on the NLU results data 485. For example, the intent-skill pair ranker 504 may send a first NLU hypothesis, associated with a first skill, to the first skill along with a request for the first skill to at least partially execute with respect to the first NLU hypothesis. The intent-skill pair ranker 504 may also send a second NLU hypothesis, associated with the second skill, to the second skill along with a request for the second skill to at least partially execute with respect to the second NLU hypothesis. The intent-skill pair ranker 504 receives, from the first skill, first result data 430*a* generated from the first skill's execution with respect to the first NLU hypothesis. The intent-skill pair ranker 504 also receives, from the second skill, second results data 430*b* generated from the second skill's execution with respect to the second NLU hypothesis. Based on the first results data 430*a*, a first NLU confidence score associated with the first NLU hypothesis, the second results data 430*b*, a second NLU confidence score associated with the second NLU hypothesis, and other data 522 (e.g., context data, user profile data, etc.), the intent-skill pair ranker 504 determines the best skill for executing the current user input. The intent-skill pair ranker 504 sends an indication of the best skill to a dispatcher component 514.

The dispatcher 514 may then send the selected skill the information needed to execute the user input, including an indication of the intent, the appropriate context data 508 (such as device identifier, user identifier, or the like), slot data, utterance identifier, dialog identifier, or any other information needed.

One or more models implemented by components of the orchestrator component 230, post-NLU ranker 265, shortlister 350, or other component may be trained and operated according to various machine learning techniques.

Figure 6:
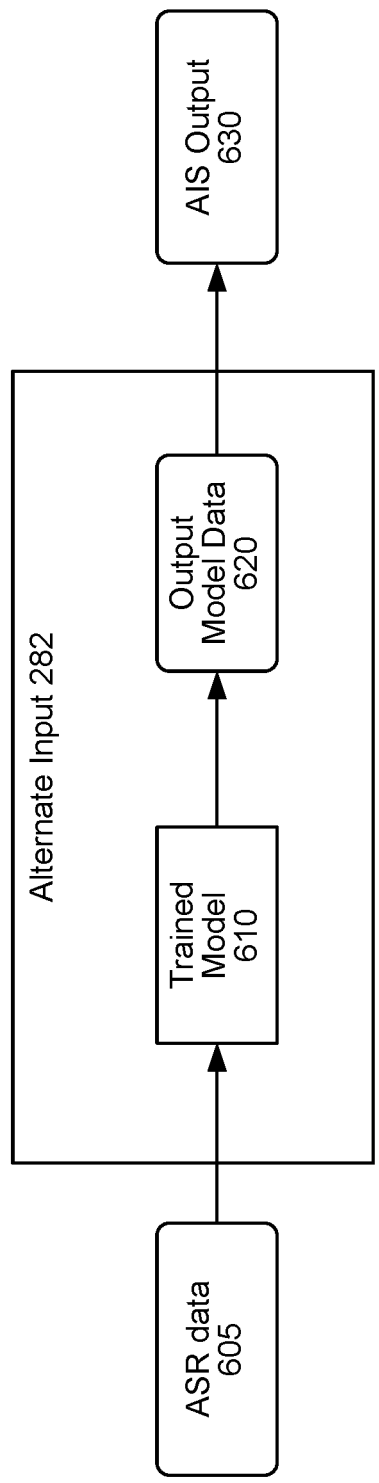
FIG. 6 is a conceptual diagram of an alternate input component according to embodiments of the present disclosure.

FIG. 6 is a conceptual diagram of the alternate input component according to embodiments of the present disclosure. The alternate input component 282 may include a trained model 610. The alternate input component 282 may receive ASR data 605 from the orchestrator 230 or from the ASR component 250. The ASR data 605 may be text data representing a user input/utterance. In some embodiments, the ASR data 605 may be tokens/token data corresponding to each word in the user input. The trained model 610 processes the ASR data 605 to determine output model data 620. The output model data 620 may indicate a probability/likelihood of the ASR data 605 resulting in an error during further processing of the user input by the SLU system(s) 120.

In an example embodiment, the trained model 610 may be a probabilistic graph, for example, a Markov Chain, having multiple nodes. Each node may represent a unique NLU interpretation including a respective domain, a respective intent and respective slot data. The output model data 620 may be determined by traversing the graph, using the ASR data 605 to determine the starting/initial node, and traversing till an end node is reached. The end node may represent an alternate representation of the user input (e.g., text data) if the end node is indicated as a success condition. A node is connected to one or more nodes using edges. The output model data 620 may be probability data based on the weights of the edges of the traversal path. The probability data may be based on a value of an intermediate node or an end node of the traversal path. In other embodiments, the probability data may be based on aggregating the weights of edges in the traversal path from an initial node to an end node. In some cases, the traversal path may end at the initial node, indicating that the ASR data 605 results in successful processing. In some cases, the end node may be indicated as an error condition, in which case the trained model 610 is unable to provide an alternative representation of the user input that will result in successful processing.

In some cases, the trained model 610 may also output one or more alternative representations of the user input that may be included in the AIS output data 630. In some cases, the trained model 610 may output alternate NLU data corresponding to the alternative representation of the user input. The alternate NLU data may include an intent and slot data corresponding to the alternative representation of the user input.

The trained model 610 may traverse multiple paths starting with the initial node representing the ASR data 605 and ending at multiple end nodes. For example, the trained model 610 may traverse a first path starting at the initial node and ending at a first end node having first probability data/score and/or corresponding alternate text data/alternate NLU data. The trained mode 610 may traverse a second path starting at the initial node and ending at a second end node having second probability data/score and/or corresponding alternate text data/alternate NLU data. In some embodiments, the alternate input component 282 may output more than one alternative representations based on them indicating a success condition during further processing. A first alternative representation may correspond to a first domain that is different than a second domain corresponding to a second alternative representation. Thus, the alternate input component 282 may output alternative representations of the user input that correspond to different domains.

In some embodiments, the alternate input component 282 may process multiple ASR hypotheses using the trained model 610 to determine a likelihood of one or more the ASR hypotheses generating an error condition during further processing.

The alternate input component 282 may generate the AIS output data 630. The alternate input component 282 may determine if the probability data/score included in the output model data 620 meets a threshold (satisfies a condition). If the probability data meets the threshold indicating that the ASR data 605 is likely to be successfully processed by the NLU component 260/SLU system(s) 120 (resulting in a desired response to the user input), then the alternate input component 282 outputs the ASR data/hypothesis 605 as the AIS output data 630. If the probability data does not meet the threshold indicating that the ASR data 605 is likely to result in an error during further processing, then the alternate input component 282 stores the alternative representation and/or alternate NLU data as the AIS output data 630.

In the case where the MS output data 630 includes multiple alternative representations of the user input, the NLU component 260 may process them to generate a N-best list of NLU hypotheses and, using the NLU merger component 262, select the best NLU hypothesis that represents the intent and slot data corresponding to the user input.

In some cases, a user may provide a subsequent user input when the system outputs an error. Often the subsequent user input may be a reformulation or rephrase of the initial user input, so the user can achieve a desired intent. The alternate input component 282 leverages such interactions by encoding initial user input data and subsequent user input data as stateful representations in a probabilistic graphical model. The probabilistic graph model, for example a Markov Chain model, may model a sequence of possible events in which the probability of each event depends on the state attained in the previous event. The alternate input component 282 is able to identify connections toward a shared intent, and allows to re-route possibly defective user input interpretation paths toward states with a higher likelihood of satisfactory user experience.

alternate input component 282 determining an alternative representation of the user input, the system(s) 120 may determine that an ambiguity exists with respect to the SLU processing of the user input.

The alternate input component 282 may be configured to determine an alternative representation of an utterance/user input that is a rewrite or rephrase of the user input and that results in the desired response to the user input. In some embodiments, the alternate input component 282 may determine an alternative representation for a user input using user-specific data. In some embodiments, the alternate input component 282 may determine a ranked list of candidate alternative representations. In yet another embodiment, the alternative input component 282 may determine whether a user input will cause friction.

In some embodiments, the alternate input component 282 may include one or more trained models 610 (e.g., machine-learning models) that may be configured to process a user input to determine one or more alternative representations corresponding to the user input. In some embodiments, the alternate input component 282 may use rephrase utterance pairs to determine an alternative representation of the user input. The alternate input component 282 may process historical dialogue session data (corresponding to multiple different users) to determine if one or more utterances in the dialogue session are a rephrase of an initial utterance. As described herein, two or more utterances are considered to be part of the same dialogue session based on the time elapsed between the utterances. The alternate input component 282 may determine the utterance rephrase pairs based on the domain, the intent, the slot type and/slot value being similar or the same between two utterances. The alternate input component 282 may also determine the utterance rephrase pairs based on the user indicating that the utterance is a rephrase of a prior user input. The alternate input component 282 may also determine the utterance rephrase pairs based on the rephrased utterance resulting in the user's desired response. In some embodiments, the alternate input component 282 may also use the NLU hypothesis corresponding to the rephrased utterance. In non-limiting examples, the alternate input component 282 may process the following dialogue session data:

Utterance (turn 1): play lonely eyes old time road
    NLU hypothesis: Domain <Music> | Intent <PlayMusic> | SongName <lonely eyes old time road>
Utterance (turn 2): play luna's x old time road
    NLU hypothesis: Domain <Music> | Intent <PlayMusic> | ArtistName <luna's x> | SongName <old time road>
Utterance (turn 3): play launa's x old time road
    NLU hypothesis: Domain <Music> | Intent <PlayMusic> | ArtistName <launa's x> | SongName <old time road>
Utterance (turn 4): play lil nas x old town road
    NLU hypothesis: Domain <Music> | Intent <PlayMusic> | ArtistName <lil nas x> | SongName <old time road>

In another example, an alternate input component 282 may determine an alternative representation of the user input based on past rephrases corresponding to the user input. The alternate input component 282 may determine that the user input is likely to cause friction (e.g., result in an error or undesired response) based on past interactions with different users. The alternate input component 282 may determine a rephrase of the user input that is known to result in a successful outcome (e.g., desired response). Based on the In the above example, the alternate input component 282 may determine that the utterance at turn 4 is the corrected/alternative representation of the other utterances since the turn 4 utterance results in the user's desired response. The alternate input component 282 may use text data representing the following utterance pairs: {play lonely eyes old time road, play lil nas×old town road}, {play luna's×old time road, play lil nas×old town road}, {play launa's×old time road, play lil nas×old town road}. Using stored rephrase utterance pairs, in some embodiments, the alternate input component 282 may determine an alternative representation of the current user input by comparing the current user input with the stored rephrase utterance pairs. Example utterance rephrase pairs may include {"play ambient mean", "play envy me"} where the rephrase corrects the ASR error, {"play blues radio news", "play blue news radio"} where the rephrase rearranges the words for better clarity, and {"play relax music", "play relaxing music from my playlist} where the rephrase specifies details for the user input.

In some embodiments, the alternate input component 282 may use indexed utterance rephrase pairs, for example, a k-Nearest Neighbor (kNN) index of alternative representation candidates. The indexed alternative representation candidates may be from a set of predefined rephrase pairs selected from historical dialogue data. The alternate input component 282 may use an index of both the original utterance and the rephrased utterance for a rephrase pair. In one embodiment, the alternate input component 282 may determine an utterance-level embedding for a user input (by processing text data corresponding to the user input using an encoder) and determine top-k relevant rephrases using the kNN index in the projected space. The alternate input component 282 may select one alternative representation for the user input and may store it as the AIS output data 630.

In some embodiments, the alternate input component 282 may use a weighted directed graph that models historical utterances and NLU hypotheses data. The nodes in the graph may represent the utterances and corresponding NLU hypotheses and the edge weights may be historical transition probabilities. Given an input utterance, the graph's API may be capable of returning a sink node such that the path from the input utterance to the sink node is most probable, and the utterance at the sink node is considered as the alternative representation of the user input. The number of utterances included in the graph may be limited, and may not be capable of determining an alternative representation for any given/arbitrary utterance if it is not included in the graph. The alternate input component 282 may leverage the graph and an utterance-level embedding (generated by processing ASR data corresponding to the user input using an encoder) to determine an alternative representation based on semantic similarities between the utterances represented in the graph and the encoded user input. The determined alternative representation may be stored as the AIS output data 630.

In some embodiments, the alternate input component 282 may use user-specific utterance rephrase pairs to determine a personalized alternative representation of a user input. For example, the alternate input component 282 may use historical dialogue session data corresponding to the particular user 5 to determine the utterance rephrase pairs as described above. The user-specific utterance rephrase pairs may be associated with the user profile identifier in the profile storage 270. For example, a user-specific utterance rephrase pair may include text data representing the following utterance rephrase pair {what is the weather in Boston, what is the weather in Austin}. The example utterance rephrase pair may have been spoken by a first user 5 associated with a first user profile corresponding to a first group of user profiles. The user-specific utterance rephrase pairs may take into account user-specific characteristics, such as the user's accent, etc. The first group of user profiles may correspond to user profiles associated with a particular location/region (e.g., users living in a particular region having a particular accent or particular way of speaking/vocabulary), a particular proficiency in interacting with the natural language processing system, a particular background, a particular preference/interest, particular demographic information, etc.

In some embodiments, the alternate input component 282 may process a user input to determine whether or not the user input will cause friction (will result in an undesired response or an error). The alternate input component 282 may use past user inputs received by the system(s) 120, and a corresponding indication of whether processing of the past user input resulted in friction. For example, the alternate input component 282 may use text data representing the user input and a Boolean value or a flag indicating whether the input caused friction. Example data may be {"What is the weather in Boston?", 1/yes/error}, {"play baby shark", 0/no/success}, etc. The alternate input component 282 may determine a likelihood of the user input causing friction, and may send data representing the likelihood to the action confirmer component 285.

In some embodiments, the alternate input component 282 may use a probabilistic graph mapping multiple past user inputs and their corresponding probability of causing an error/undesired response. The alternate input component 282 may determine utterance-level embedding (by processing text data representing the user input using an encoder), and may determine a likelihood of the user input causing friction based the semantic similarity between the user input and the past user inputs represented in the probabilistic graph.

If the alternate input component 282 determines that the user input will cause friction based on the determined likelihood satisfying a threshold/condition, then the alternate input component 282 may determine an alternative representation of the user input as described above using utterance rephrase pairs. If the alternate input component 282 determines that the input utterance will not cause friction (e.g., result in the desired response) based on the determined likelihood satisfying another threshold/condition, then the alternate input component 282 may not determine an alternative representation of the user input.

In some cases, the alternate input component 282 may not determine or is unable to determine an alternative representation of the user input. In that case, the AIS output data 630 may be null. Otherwise, the AIS output data 630 may include text data representing the alternative representation of the user input and/or NLU data (intent, slot, domain, entity, etc.) corresponding to the alternative representation of the user input.

Figure 7:
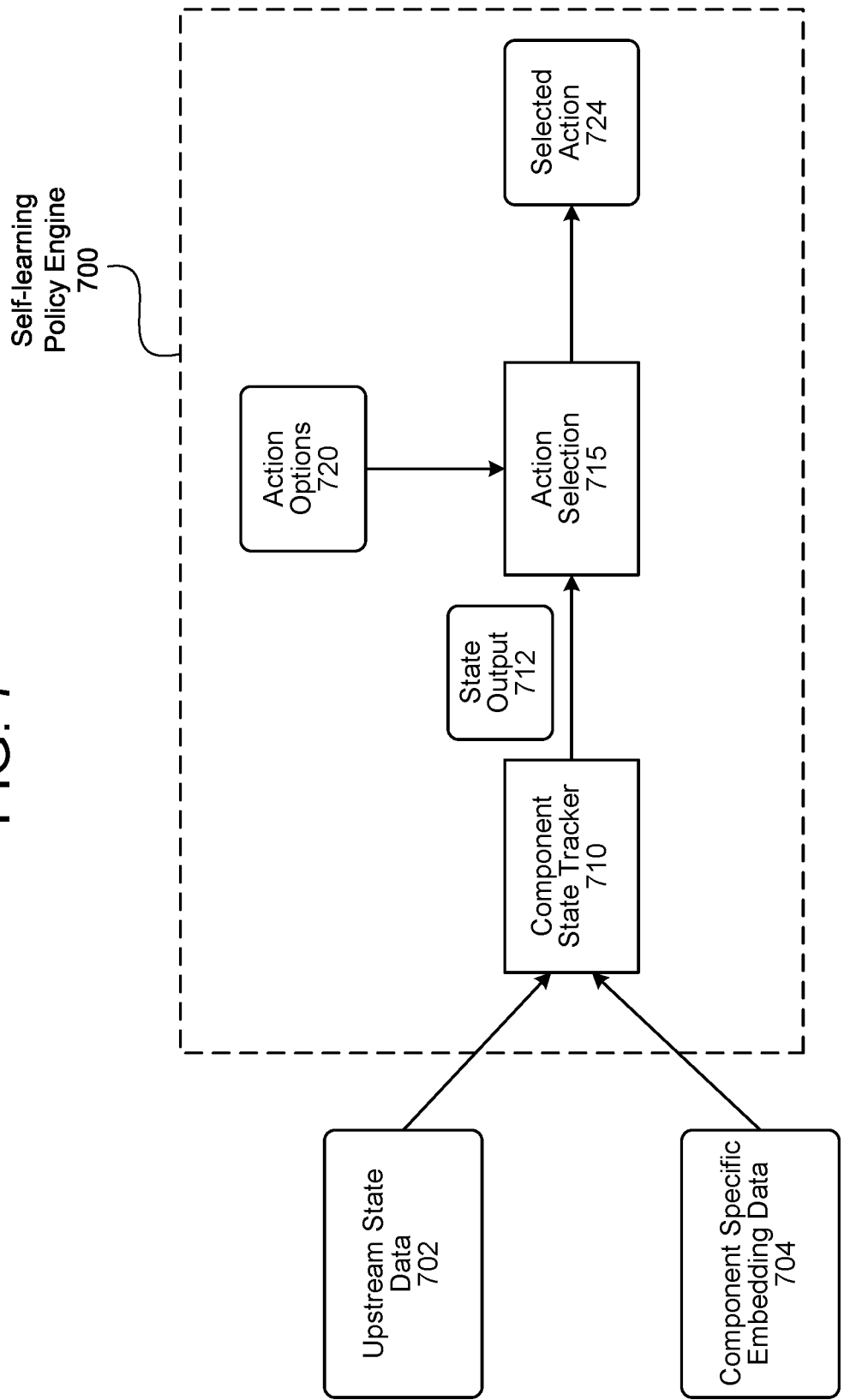
FIG. 7 is a conceptual diagram of components of a self-learning policy engine that can be used by the SLU system according to embodiments of the present disclosure.

FIG. 7 is a conceptual diagram of components of a self-learning policy engine 700 that can be used by an SLU system according to embodiments of the present disclosure. The goal of the self-learning policy engine 700 is to pick the best known action for any given state. In some embodiments, the actions are ranked and/or assigned values relative to one another. The self-learning policy engine 700 may learn via a reward system as described in relation to FIG. 14. The self-learning policy engine 700 may implement one or more algorithms, one or more machine learning models (such as neural networks), one or more probabilistic graphs, and/or the like to learn/configure state-action pairs (representing an action to be taken for a particular state). A component state tracker 710 may be configured to process various data to determine state output data 712. The state output data 712 may be used by an action selection component 715 to select an action, where the action is selected from the actions represented in action options data 720 and selected action data 724 may indicate the selected action.

In some embodiments, the component state tracker 710 may be a machine learning model, for example, a long short-term memory (LSTM) recurrent neural network (RNN) model or another type of machine learning model (e.g., deep learning model, convolutional neural network, a classifier model, a probabilistic graph model, etc.). The component state tracker 710 may process component specific embedding data 704 and upstream state data 702 when available.

A SLU processing component may need component-specific data to perform the processing it is configured for. For example, the alternate input component 282 may need ASR data to perform its function, the NLU merger component 262 may need NLU data to perform its function, the post-NLU ranker 265 may need ranked NLU data to perform its function, etc. Such component-specific data may be processed by an encoder (e.g., encoder 850) to determine the component specific embedding data 704. For example, the component specific embedding data 704 may be encoded ASR data, encoded NLU data, or encoded ranked NLU data.

In some embodiments, the component specific embedding data 704 may include utterance embedding data that is determined by processing text data, representing a user input, using the encoder 850. The text data representing the user input may be determined by the ASR component 250 and may be included in the ASR data/hypotheses output by the ASR component 250. In some embodiments, the ASR data may include tokens/token data determined by the ASR component 250, where each token data may represent features corresponding to each word in the user input. In some embodiments, the component specific embedding data 704 may include user embedding data that is determined by processing user profile data associated with the user 5 (that provides the user input) using the encoder 850. The user profile data may be stored in the profile storage 270 and may be associated with a profile identifier of the user 5. In some embodiments, the component specific embedding data 704 may be dialog embedding data that is determined by processing dialog data, associated with the dialog session that the user 5 is presently engaged in, using the encoder 850.

Figure 8:
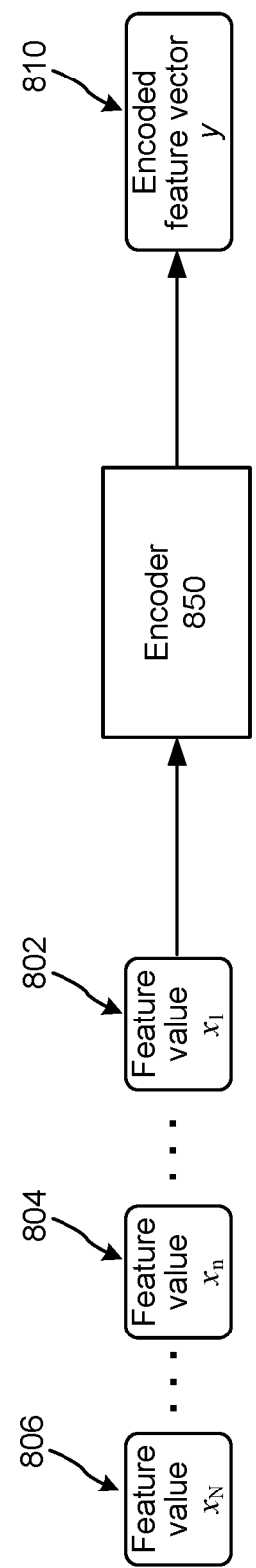
FIG. 8 is a conceptual diagram of a vector encoder, according to embodiments of the present disclosure.

Referring to FIG. 8, the component specific embedding data 704 may be generated using an encoder 850, which can create a fixed-size vector to represent certain characteristics of input data. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations. As illustrated in FIG. 8, feature values 802 through 806 (which may represent ASR data, NLU data, user profile data, dialog data, or the like) may be input into the encoder 850, which outputs an encoded feature vector 810 that represents the component specific embedding data 704. Regardless of how many feature values are input, any particular encoder 850 is configured to output vectors of the same size, thus ensuring a continuity of output encoded vector size from any particular encoder 850 (though different encoders may output vectors of different fixed sizes) and enabling comparing different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder 850 may be implemented as a neural network (NN), recurrent neural network (RNN), GMM, or other model. One particular example is a long short-term memory (LSTM) RNN. There are a variety of ways for the encoder 850 to consume data input therein, including but not limited to linear, one direction (forward or backward); bi-linear, essentially the concatenation of a forward and a backward embedding; or tree, based on parse-tree of the sequence. In addition, an attention model can be used, which may be another RNN or deep neural network (DNN) that learns to "attract" attention to certain parts of the input. The attention model can be used in combination with the above methods of consuming the input.

FIG. 8 illustrates operation of the encoder 850. The input feature value sequence, starting with feature value $x_1$ 802, continuing through feature value $x_n$ 804, and concluding with feature value $x_N$ 806 is input into the encoder 850. The encoder 850 may process the input feature values as noted above. The encoder 850 outputs the encoded feature vector y 810, which is a fixed length feature vector of length F.

Referring back to FIG. 7, the upstream state data 702 may be state output data generated for an upstream SLU processing component. For example, the alternate input component 282 may implement an instance of the self-learning policy engine 700 and may generate first state output data by processing some embedding data. In this example, the first state output data may be provided to the NLU merger component 262, which is downstream from the alternate input component 282 within the SLU processing pipeline, as the upstream state data 702.

An instance of the component state tracker 710 (e.g., first component state tracker) may be specifically trained/configured for processing data for the particular SLU component. For example, the alternate input component 282 may implement a first instance of component state tracker 710 for the alternate input component 282 may be configured to process utterance embedding data, user embedding data and dialog embedding data to generate the state output data 712 corresponding to the alternate input component 282; the NLU merger component 262 may implement a second instance of the component state tracker 710 configured to process NLU embedding data and upstream state data (corresponding to the alternate input component 282) to generate the state output data 712 corresponding to the NLU merger component 262; etc. As such, the state output data 712 may correspond to or represent features of various data that the particular SLU component may use to process the user input and/or may use to select from a variety of actions to perform.

The action selection component 715 may be configured to process the state output data 712 to select an action from the action options 720 corresponding to the particular SLU component. The action selection component 715 may be a machine learning model, for example, a neural network, a probabilistic graph, a classifier or the like. Based on the features represented in the state output data 712, the action selection component 715 may generate the selected action data 724, which may include an indication of the selected action. The action options 720 may correspond to an action space and may include representations of various discrete actions that the action selection component 715 can choose from. In some embodiments, the action options 720 may be a table where different action descriptions may be associated with alphanumerical values, for example, a first action "do not override ASR" may be associated with "a" or "1", a second action "override ASR" may be associated with "b" or "2", etc. In some embodiments, the action options 720 may indicate the actions in a hierarchy, such that a higher ranked/listed action is to be given priority/preference over a lower ranked/listed action.

An instance of the action selection component 715 may be specifically trained/configured for selecting an action for the particular SLU component. For example, the alternate input component 282 may implement an action selection component 715 configured to process state output data (corresponding to the alternate input component 282) and select an action from the action options 720 corresponding to the alternate input component 282. In another example, the NLU merger component 262 may implement an action selection component 715 configured to process state output data (corresponding to the NLU merger component 262) and select an action from the action options 720 corresponding to the NLU merger component 262.

Figure 9:
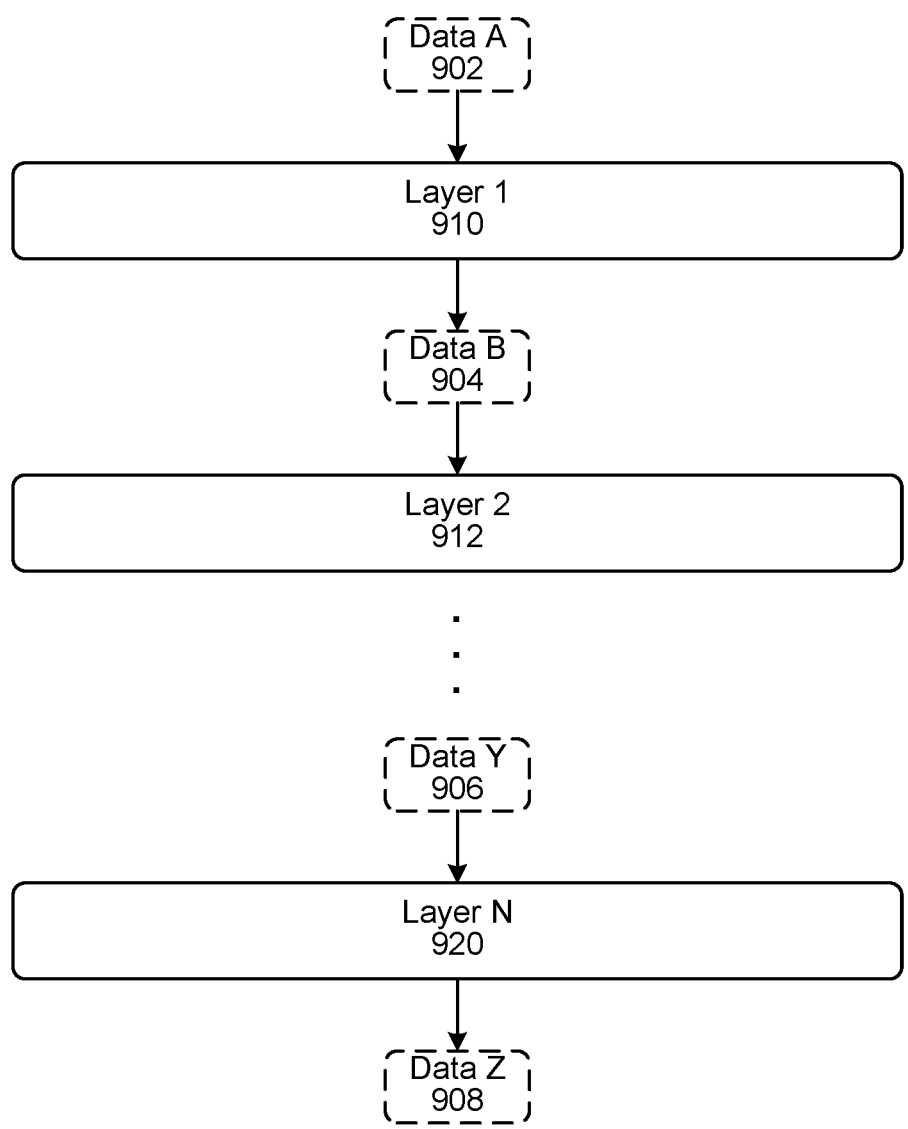
FIG. 9 is a conceptual diagram illustrating layers of a trained model according to embodiments of the present disclosure.

One or more components, such as the component state tracker 710 and the action selection component 715, etc. may use trained models for operations. A trained model may take many forms, including a neural network. As illustrated in FIG. 9, a neural network may include a number of layers, from input layer 1 910 through output layer N 920. Each layer is configured to output a particular type of data and output another type of data. The neural network illustrated in FIG. 9 is configured to input data of type data A 902 (which is the input to layer 1 910) and output data of type data Z 908 (which is the output from the last layer N 920). The output from one layer is then taken as the input to the next layer. For example, the output data (data B 904) from layer 1 910 is the input data for layer 2 912 and so forth such that the input to layer N 920 is data Y 906 output from the penultimate layer (not shown).

While values for the input data/output data of a particular layer are not known until a neural network is actually operating during runtime, the data describing the neural network describes the structure and operations of the layers of the neural network. The data describing the neural network may be referred to as model output data and may include weights, parameters and other data learned by the trained model during the training process using a training dataset.

Figure 10:
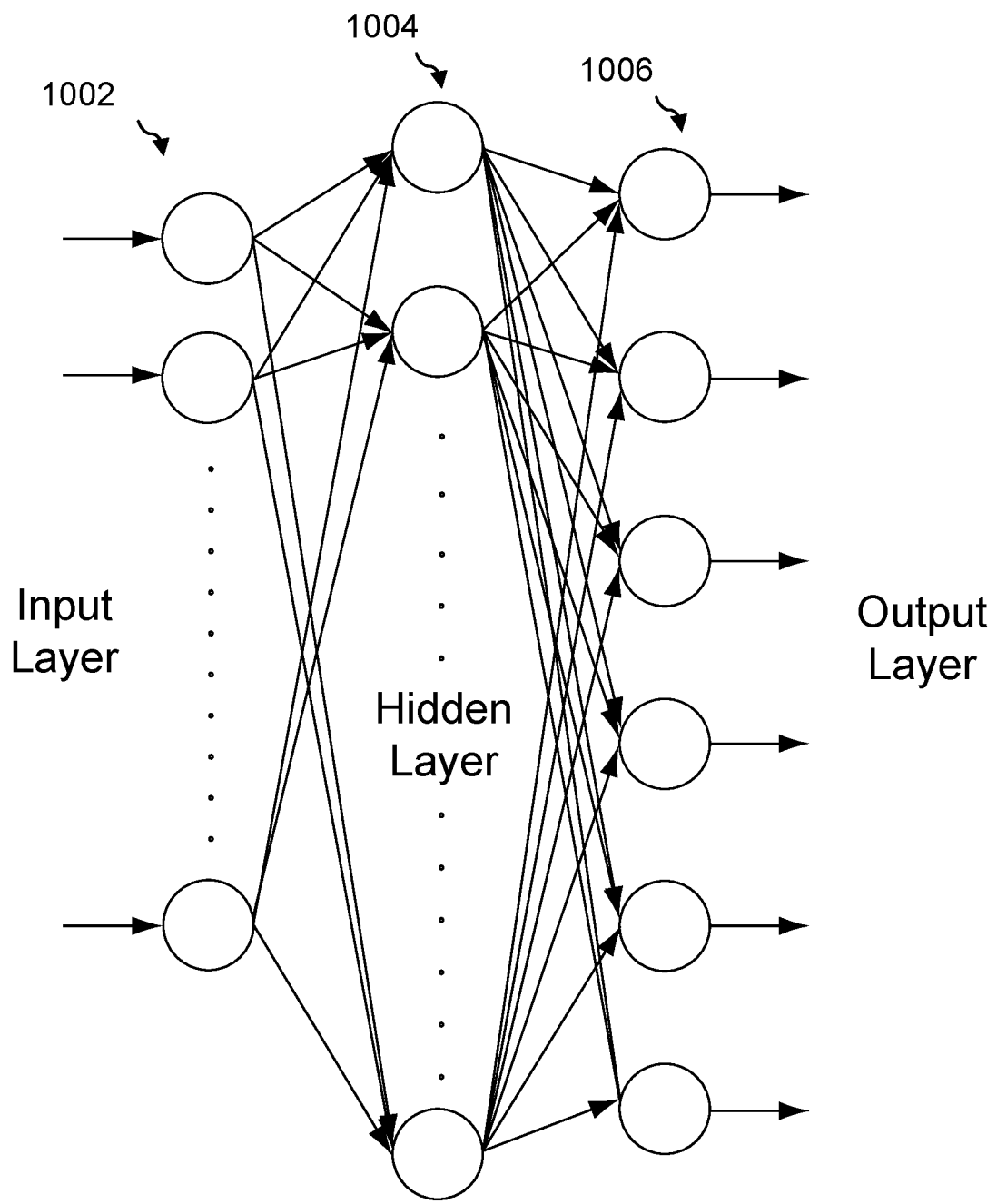
FIG. 10 illustrates a neural network for certain components according to embodiments of the present disclosure.

As described herein, one or more neural networks may be used to determine state data and select an action to be performed by an SLU component. An example neural network is illustrated in FIG. 10. A neural network may be structured with an input layer 1002, a middle layer 1004, and an output layer 1006. The middle layer may also be known as the hidden layer. Each node of the hidden layer is connected to each node in the input layer and each node in the output layer. Although illustrated in FIG. 10 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 11:
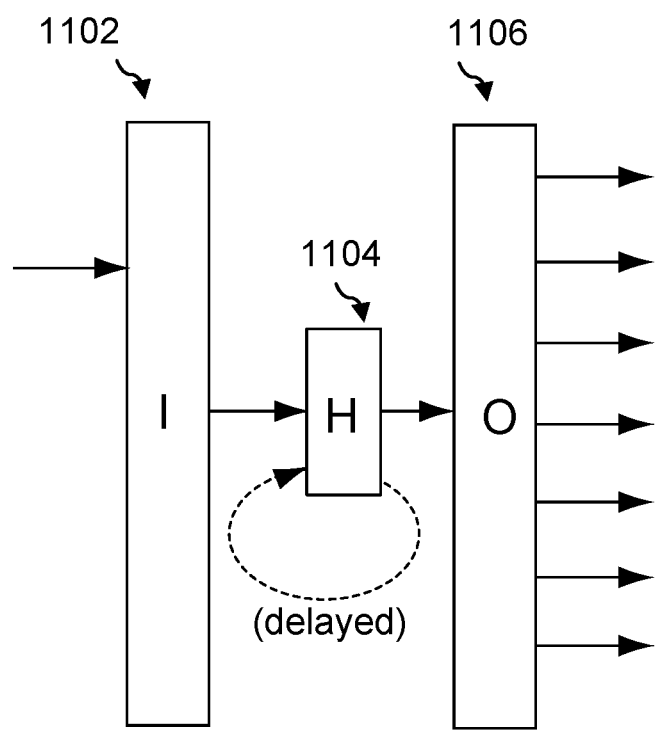
FIG. 11 illustrates a neural network for certain components according to embodiments of the present disclosure.

In one aspect, the neural network may be constructed with recurrent connections such that the output of the hidden layer of the network feeds back into the hidden layer again for the next set of inputs. Such a neural network is illustrated in FIG. 11. Each node of the input layer 1102 connects to each node of the hidden layer 1104. Each node of the hidden layer 1104 connects to each node of the output layer 1106. As illustrated, the output of the hidden layer 1104 is fed back into the hidden layer for processing of the next set of inputs. A neural network incorporating recurrent connections may be referred to as a recurrent neural network (RNN).

In some embodiments, the upstream state data 702 may be model output data (parameters, weights, scores, etc.) capable of being processed by the trained model of the component state tracker 710 of the upstream SLU component. In some embodiments, the upstream state data 702 may be data corresponding to one or more layers/hidden layers (e.g., 910, 912, 920, data corresponding to 1004, data corresponding to 1104, etc.) of the trained model for the component state tracker 710 of the upstream SLU component.

In some embodiments, the state output data 712 may be data corresponding to an output layer of the trained model for the component state tracker 710 of the instant SLU component.

FIG. 12 conceptually illustrates an example of how multiple components of the SLU system may implement self-learning policy engines. A first component of the SLU system may implement a first instance of the self-learning policy engine 700, and a second component (downstream from the first component) of the SLU system may implement a second instance of the self-learning policy engine 700. As shown in the FIG. 12, the first component may be the alternate input component 282 and the second component may be the NLU merger component 262. It will be appreciated that while the foregoing describes first and second components of the SLU system implementing instances of the self-learning policy engine, that the first and second components do not necessarily refer to first and second components sequentially invoked/executed in a SLU processing pipeline.

The alternate input component 282 may process first embedding data, for example, dialog embedding data 1202, utterance embedding data 1204, and/or user embedding data 1206, using a component state tracker 1210. The first embedding data may be the component specific embedding data 704 as described with respect to FIG. 7.

The dialog embedding data 1202 may correspond to dialog data for the present dialog session that includes the user input. A user input and performance by the system of a corresponding action responsive to the user input, may be referred to as a dialog "turn." The SLU system(s) 120 may associate a dialog session with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the device response. The SLU system(s) 120 may use the dialog session identifier or other data to track the progress of the dialog to select system responses in a way that tracks the previous user-system exchanges, thus moving the dialog along in a manner that results in a desirable user experience.

The dialog data used to determine the dialog embedding data 1202 may include first text data representing the user input and second text data representing the system-generated response to the user input. The dialog data may additionally or alternatively include ASR data and/or NLU data corresponding to the user input as determined by the ASR component 250 and the NLU component 260. The dialog data may additionally or alternatively include a skill 290 selected to respond to the user input. The dialog data may additionally or alternatively include text data representing any user input and corresponding system-generated response prior to the current user input. As such, the dialog data may be dialog history data corresponding to the dialog turns prior to the current user input for the current dialog session.

The utterance embedding data 1204 may correspond to the current user input. In some embodiments, the utterance embedding data 1204 may be determined using text data representing the user input as determined by the ASR component 250. In some embodiments, the utterance embedding data 1204 may be determined using ASR data corresponding to the user input as determined by the ASR component 250, where the ASR data may include a 1-best ASR hypothesis and corresponding ASR confidence score, or an N-best list of ASR hypotheses and corresponding ASR confidence scores.

The user embedding data 1206 may be determined using profile data associated with the user 5. The profile data may be retrieved from the profile storage 270 using the profile identifier associated with the user 5. The profile data may include user preferences data, past interaction data (e.g., past user inputs from the user 5, system-generated responses to the past user inputs, a skill(s) 290 selected to respond to the past user inputs, etc.), demographic information, device identifiers associated with the user profile, device type information for the associated devices, device capabilities of the associated device, location data, and the like.

The component state tracker 1210 may process the embedding data 1202, 1204 and/or 1206 to determine first state data that is used by a first action selection component 1215 to select an action that the alternate input component 282 is to perform with respect to processing of the current user input. The first state data may correspond to features that the alternate input component 282 may use to determine whether or not to generate an alternative representation of the current user input.

The action selection component 1215 of the alternate input component 282 may be configured to process the first state data and the action options data 1212 to select an action. In an example embodiment, the action options data 1212 for the alternate input component 282 may include the following actions: (a) do not send an alternative representation; (b) send an alternative representation using data corresponding to multiple different users; (c) send a personalized alternative representation using profile data for the user 5; and (d) send multiple alternative representations. Using the first state data, the action selection component 1215 may generate selected action data 1218 indicating which of the four actions the action selection component 1215 selected for the alternate input component 282 to perform. The alternate input component 282 may perform the selected action, indicated by the selected action data 1218, as described above in relation to FIG. 6. The selected action data 1218 may be a signal that is sent to the alternate input component 282 to activate the appropriate trained model 610 to enable the alternate input component 282 to perform the selected action.

For example, based on processing the first state data, the action selection component 1215 may determine that the alternate input component 282 should perform action (c) (i.e., send a personalized alternative representation using profile data for the user 5). As described above in relation to FIG. 6, the alternate input component 282 may determine a personalized alternative representation for the user input and send it to the orchestrator 230 as AIS output 630. In another example, if the action selection component 1215 determines that the alternate input component 282 should perform action (d) (i.e., send multiple alternative representations). Then, as described above in connection with FIG. 6, the alternate input component 282 may determine a list of alternative representations and send the list to the orchestrator 230 as the AIS output 630. In this manner, the first component/alternate input component 282 of the SLU system may use the component state tracker 1210 and the action selection component 1215 to determine which action to take with respect to processing the user input and then perform the action using one or more other components of the alternate input component 282.

If a new action is to be added or an existing action is to be changed for the alternate input component 282, then the action options data 1212 can be modified accordingly. For example, the alternate input component 282 may be configured to determine an alternative representation of the user input using a different method/technique than described in relation to FIG. 6. An action to send the alternative representation per this method can be added as action (e) to the action options 1212.

The NLU merger component 262 may process second embedding data, for example NLU embedding data 1208, user embedding data 1209, and upstream state data 702 using a second component state tracker 1230. The second embedding data may be the component specific embedding data 704 for the second component of the SLU system.

The NLU embedding data 1208 may be determined using NLU data corresponding to the instant user input and determined by the NLU component 260, where the NLU data may include the 1-best NLU hypothesis and the corresponding NLU confidence score or the N-best list of NLU hypotheses and the corresponding NLU confidence scores.

The user embedding data 1209 may be determined using profile data associated with the user 5, in a similar manner as the user embedding data 1206. The user embedding data 1209 may represent any updated information with respect to the profile data and the user 5 based on the instant user input. For example, when the alternate input component 282 is processing the user input, the SLU system(s) 120 determines the user embedding data 1206 using existing profile data stored in the profile storage 270 prior to the user 5 providing the user input. In some embodiments, the SLU system(s) 120 determines updated user embedding data 1209 based on information derived from the instant user input/interaction that may reflect changes/updates, as compared to existing profile data, for example, in user preferences, user sentiment, device preferences, location information, etc.

The upstream state data 702, in this case, may be the first state data output from the component state tracker 1210. In some embodiments, the upstream state data 702 is a portion of the first state data, for example data relating to one or more layers/hidden layers of the component state tracker 1210, which may be an LSTM. In some embodiments, one or more layers of the LSTM of the (downstream) component state tracker 1230 may be initialized/activated using data from one or more layers/hidden layers of the LSTM of the (upstream) component state tracker 1210.

The component state tracker 1230 may process the embedding data 1208 and the upstream state data 704 to determine second state data that is used by a second action selection component 1235 to select an action that the NLU merger component 262 performs with respect to processing of the current user input. The second state data may correspond to features that the NLU merger component 262 may use to determine which NLU hypothesis(es) to send downstream for further processing.

The action selection component 1235 of the NLU merger component 262 may be configured to process the second state data and the action options data 1232 to select an action. In an example embodiment, the action options data 1232 for the NLU merger component 262 may include the following actions: (a) no override of ASR hypothesis; (b)

override the ASR hypothesis; (c) send merged NLU list based on ASR N-best list and alternative representation(s) of the user input; (d) confirm the ASR hypothesis with the user; and (e) confirm the alternative representation with the user. Using the second state data, the action selection component 1235 may generate selected action data 1238 indicating which of the five actions the action selection component 1235 selected for the NLU merger component 262 to perform. The NLU merger component 262 may perform the selected action indicated by 1238 as described above in relation to FIG. 2.

The NLU merger component 262 may determine the NLU output data 1240 based on the selected action 1238, and send the NLU output data 1240 to the orchestrator 230 for further downstream processing.

In some embodiments, the embedding data (e.g., 1202, 1204, 1206, 1208) may be determined by another component (not shown) that may keep track of and store embedding data corresponding to the user 5 and/or a particular user input/dialog session.

Figure 13:
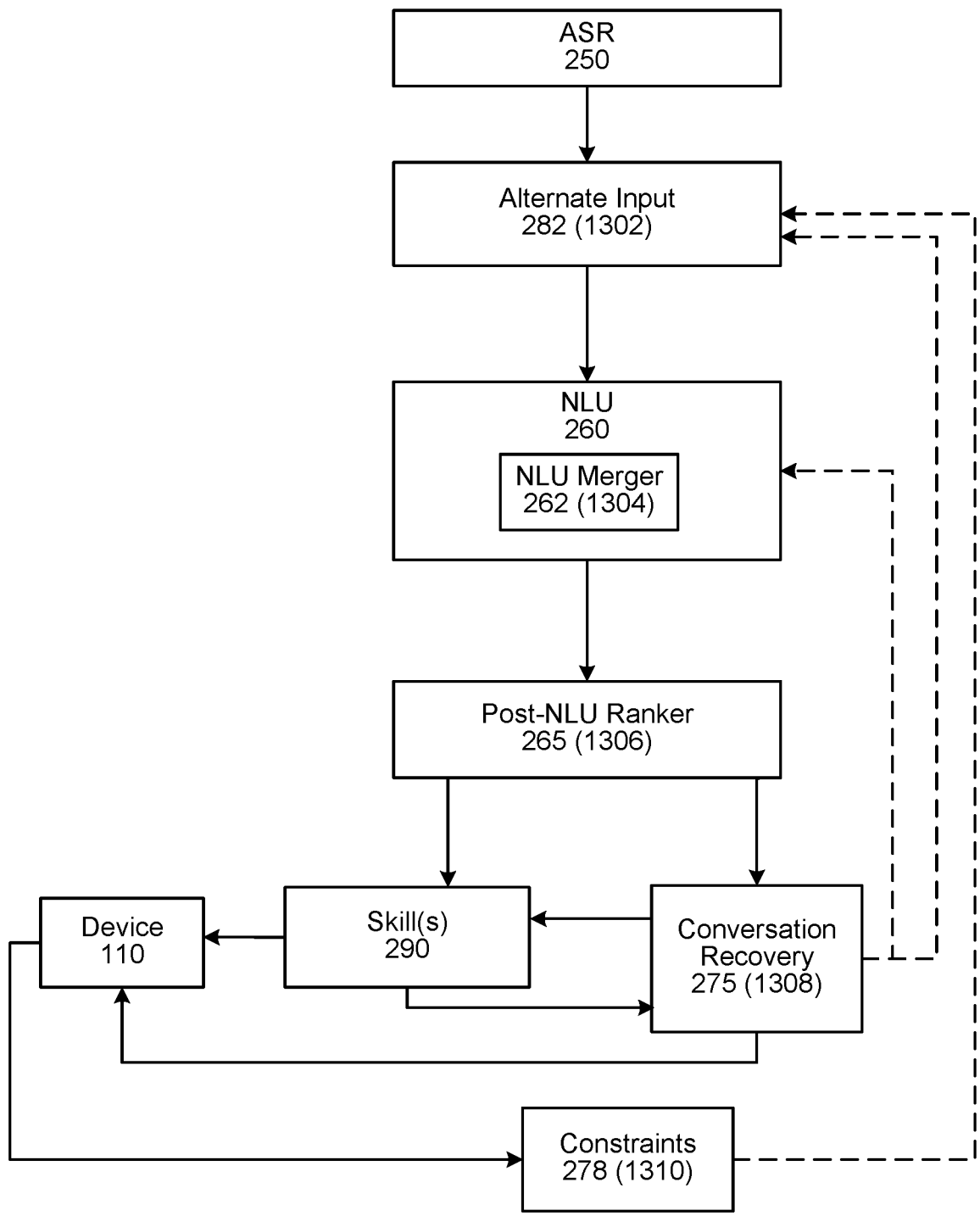
FIG. 13 is a conceptual diagram illustrating how various components of the SLU system can use self-learning policy engines for different stages of SLU processing of a user input according to embodiments of the present disclosure.

FIG. 13 is a conceptual diagram illustrating how various components of the SLU system can use self-learning policy engines for different stages of SLU processing of a user input. In an example SLU processing pipeline, as shown, the ASR component 250 may process audio data to determine ASR data (as described above in relation to FIG. 2). The next processing stage may involve the alternate input component 282, which, as described in connection with FIG. 12, may use the self-learning policy engine (1302) to select from a variety of actions that the alternate input component 282 can perform. The next processing stage may involve the NLU component 260 to determine NLU data (as described above in relation to FIG. 4). The NLU component 260 may include the NLU merger component 262, which, as described in connection with FIG. 12, may use the self-learning policy engine (1304) to select from a variety of actions that the NLU merger component 262 can perform.

The next processing stage may involve the post-NLU ranker 265 to determine ranked NLU output data (as described above in relation to FIG. 5). The post-NLU ranker 265 may use the self-learning policy engine (1306) to select from a variety of actions. For example, the post-NLU ranker 265 may include a component state tracker (e.g., 710) specifically configured to process upstream state data from the NLU merger component 262 and process any embedding data specific to the post-NLU ranker 265 (e.g., embedding data corresponding to context data 508, NLU results data 485, other data 420, etc.) to determine state data (e.g., third state data) for this stage of SLU processing. The post-NLU ranker 265 may also include an action selection component (e.g., 715) specifically configured to process the third state data to select from action options (e.g., 720) specifically for the post-NLU ranker 265. The action options for the post-NLU ranker 265 may include: (a) route to conversation recovery in last priority; (b) route to conversation recovery in higher priority; and (c) route to a skill 290.

Based on the selected action, the next processing stage may involve the conversation recovery component 275 or the skill(s) 290. The conversation recovery component 275 may use the self-learning policy engine (1308) to select from a variety of actions. For example, the conversation recovery component 275 may include a component state tracker (e.g., 710) specifically configured to process upstream state data from the post-NLU ranker 265 and process any embedding data specific to the conversation recovery component 275 to determine state data (e.g., fourth state data) for this stage of SLU processing. The conversation recovery component 275 may also include an action selection component (e.g., 715) specifically configured to process the fourth state data to select from action options (e.g., 720) specifically for the conversation recovery component 275. The action options for the conversation recovery component 275 may include: (a) drop user request by not responding/silent response; (b) route to target domain/skill; (c) confirm entity or response with user; (d) route to NLU component; (e) route to dialog engagement component to engage user in a dialog (e.g., requesting clarification of the user input, additional information, etc.); and (f) confirm one or more alternative representations of the user input. Based on the selected action, the conversation recovery component 275 may send data to the skill(s) 290 or send output data to the device 110. The conversation recovery component 275 may also share/send its state data (fourth state data) to the alternate input component 282 and/or the NLU component 260 to perform further processing on the instant user input, for example, based on the user's response to the system asking to confirm the action to take in response to the instant user input, the alternate input component 282 or the NLU component 260 may determine some data based on the user's response (e.g., NLU data/hypotheses corresponding to the user's response, alternative representations/inputs based on the user's response, etc.). The conversation recovery component 275 may also share/send its state data (fourth state data) to the alternate input component 282 and/or the NLU component 260 to perform processing on a subsequent/next user input within the dialog session, for example, the alternate input component 282 and the NLU component 260 may use the user's response to the dialog outputted by the conversational recovery component 275 in determining an appropriate action with respect to the next user input.

In some cases, the user may provide feedback in response to the output generated by the SLU system(s) 120 responsive to the user input. The constraints component 278 may use the self-learning policy engine (1310) to select from a variety of actions to perform with respect to the user feedback. For example, the constraints component 278 may include a component state tracker (e.g., 710) specifically configured to process upstream state data from other components (e.g., post-NLU ranker 265, conversation recovery 275, etc.) and process any embedding data specific to the constraints component 278 to determine state data (e.g., fifth state data). The constraints component 278 may also include an action selection component (e.g., 715) specifically configured to process the fifth state data to select from action options (e.g., 720) specifically for the constraints component 278. The action options for the constraints component 278 may include: (a) do not blacklist output/system response; (b) blacklist output/system response for multiple different users; (c) blacklist output/system response for user 5; (d) blacklist output/system response for a group of users; and (e) blacklist output/system response for a period of time. Based on the selected action, the constraints component 278 may send data to the alternate input component 282. The constraints component 278 may share/send its state data (fifth state data) to the alternate input component 282 so that the alternate input component 282 can use it for further processing of the instant user input or for processing of a subsequent/next user input in the dialog session.

In this manner, various components of the SLU system(s) 120 may implement an instance of the self-learning policy engine (illustrated in FIG. 7) to leverage any processing/state data available from upstream components and to select from a variety of actions that the SLU component can perform.

Figure 14:
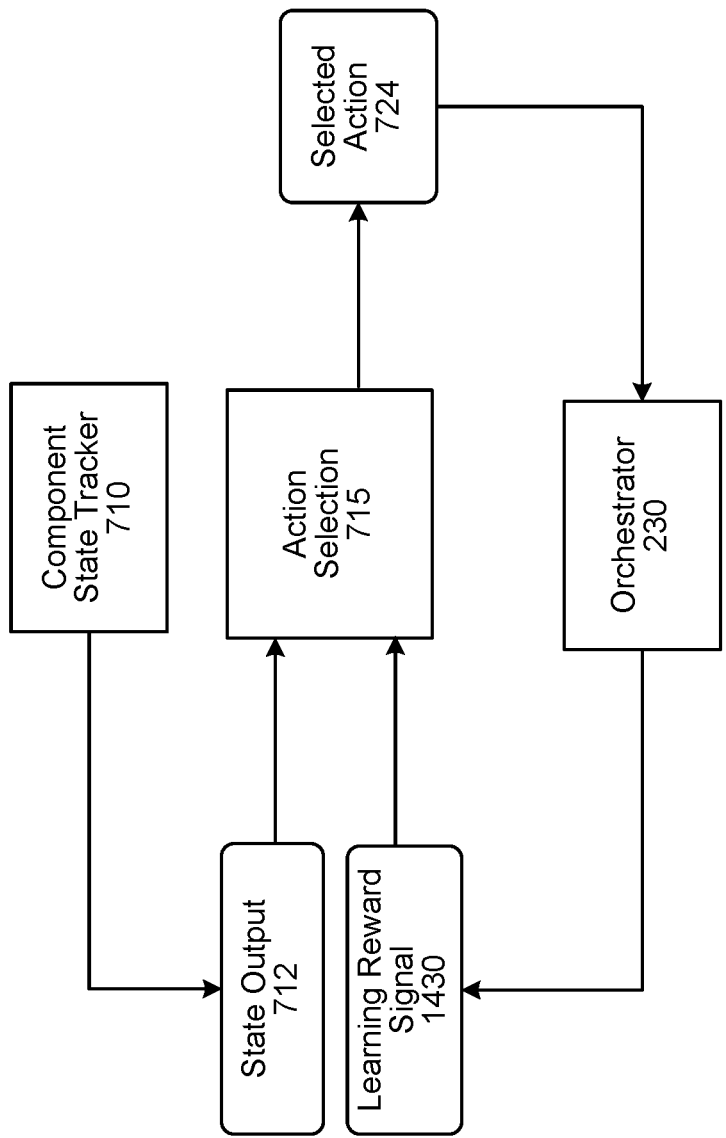
FIG. 14 is a conceptual diagram illustrating how the self-learning policy engine can use reward-based learning according to embodiments of the present disclosure.

FIG. 14 is a conceptual diagram illustrating how the self-learning policy engine can use reinforcement learning to train/configure the action selection component 715 to select from a variety of actions. In some embodiments, the self-learning policy engine may use deep reinforcement learning combining artificial neural networks with a reinforcement learning architecture that enables the action selection component 715 to learn the best actions possible for the particular SLU component in order to attain the particular SLU processing goals. The self-learning policy engine may combine function approximation and target optimization by mapping state-action pairs to expected rewards.

The self-learning policy engine, consisting of the action selection component 715 and the component state tracker 710, may be a goal-oriented algorithm that learns how to attain a complex objective/goal using incentives, such as a reward (e.g., learning reward signal 1430), received from the SLU system(s) 120. When the self-learning policy engine selects the wrong action for the SLU component, the SLU component/system(s) 120 may penalize the decision via the learning reward signal 1430. When the correct action is selected, the SLU component/system(s) 120 may reward the decision via the learning reward signal 1430.

The learning reward signal 1430 may represent feedback from the SLU component/system(s) 120 by which the action selection component 715 measures its success or failure in selecting the action 724 for the given state data 712. In some embodiments, the SLU component/system(s) 120 may send the learning reward signal 1430 to the action selection component 715 after an output responsive to the user input is presented to the user. The learning reward signal 1430 may be a numerical value representing rewarded or penalized points (e.g., +10 points, −5 points, +1 points, 0 points), etc.

In some embodiments, the learning reward signal 1430 may be based on feedback received from the user in response to the output responsive to the user input. For example, if the user feedback is positive, then the learning reward signal 1430 may reward the action selection component 715. If the user feedback is negative, then the learning reward signal 1430 may penalize the action selection component 715. In some embodiments, the learning reward signal may be received in a delayed fashion, such that, it is available after the dialog session/user interaction has ended.

In some embodiments, the learning reward signal 1430 may be based on feedback from the skill 290, where the skill 290 may indicate to the SLU component whether or not it was the appropriate skill to respond to the particular user input. In some embodiments, the learning reward signal 1430 may be based on feedback provided by a human annotator or an application/skill developer who may provide an annotated user input indicating the text representing the user input, intent corresponding to the user input, the slot values corresponding to the user input, the domain corresponding to the user input and the skill 290 corresponding to the user input, as perceived or understood by the human annotator.

The state output data 712, in this sense, may represent a concrete and immediate situation based on which the action selection component 715 is to select the action 724. The action selection component 715 may implement a policy/strategy (using one or more algorithms, one or more machine learning models, etc.) to determine which action to select based on the current state data. The policy/strategy may map/correlate states represented by the state data to actions represented in the action options 720 based on which mapping/correlation will result in the highest reward.

The self-learning policy engine may learn by running the action selection component 715 through sequences of state-action pairs, observing the rewards that result, and configuring the algorithms of the action selection component 715 to accurately predict the best action for the action selection component 715 to select.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 6, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Figure 15:
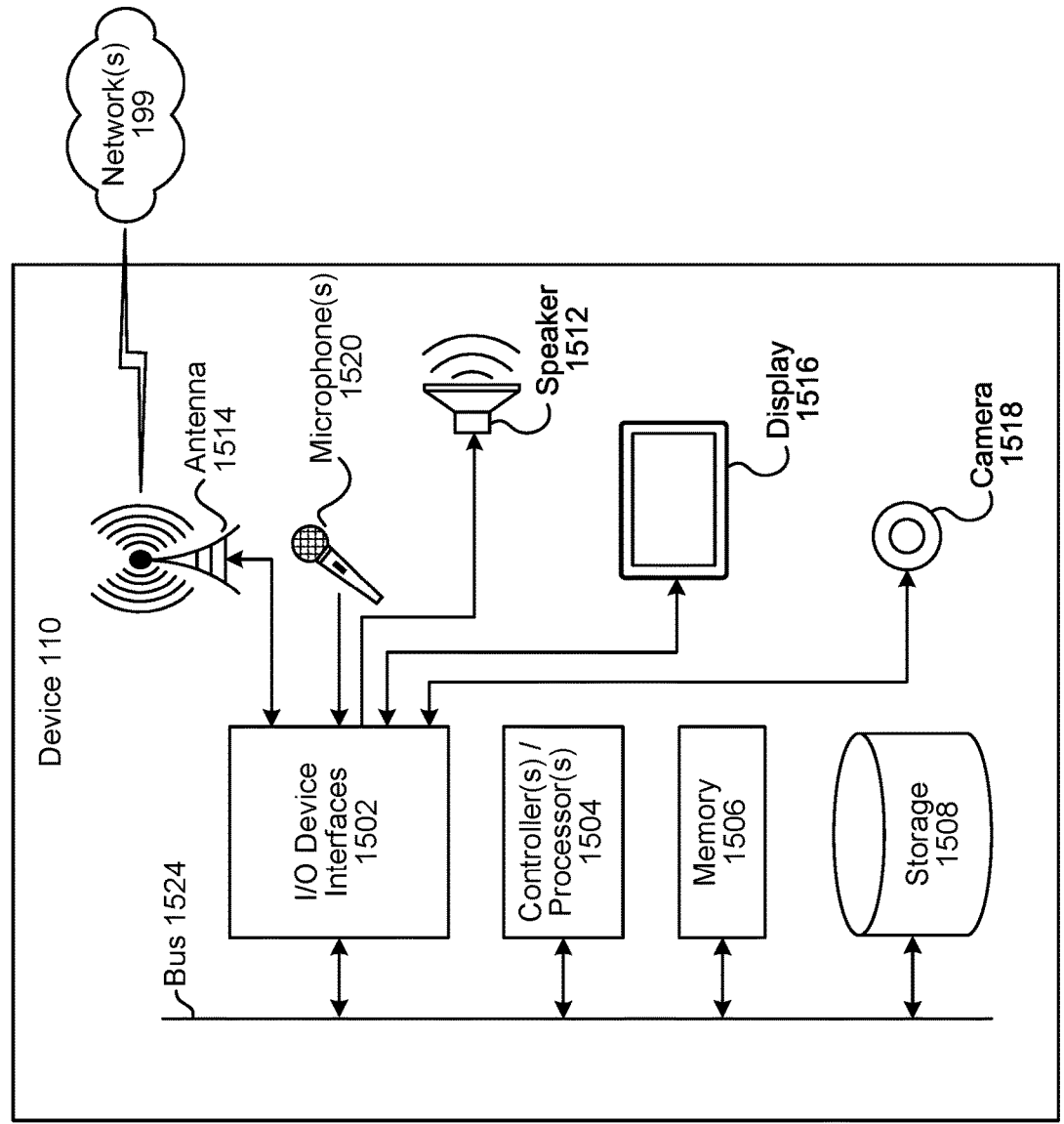
FIG. 15 is a block diagram conceptually illustrating example components of a device according to embodiments of the present disclosure.
Figure 16:
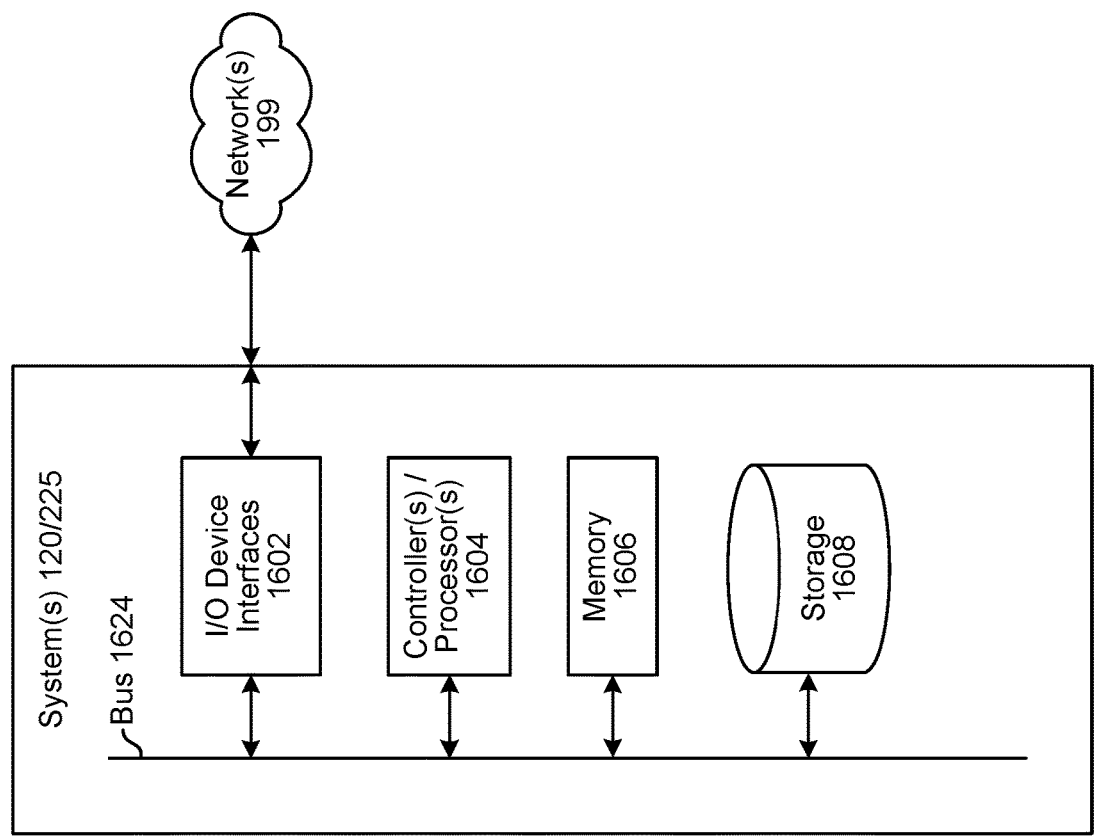
FIG. 16 is a block diagram conceptually illustrating example components of a system according to embodiments of the present disclosure.

FIG. 15 is a block diagram conceptually illustrating a device 110 that may be used with the system. FIG. 16 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120/225) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1502/1602).

Computer instructions for operating each device (110/120/225) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/225) includes input/output device interfaces (1502/1602). A variety of components may be connected through the input/output device interfaces (1502/1602), as will be discussed further below. Additionally, each device (110/120/225) may include an address/data bus (1524/1624) for conveying data among components of the respective device. Each component within a device (110/120/225) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1514, the input/output device interfaces 1502 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (1502/1602), processor(s) (1504/1604), memory (1506/1606), and/or storage (1508/1608) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 17:
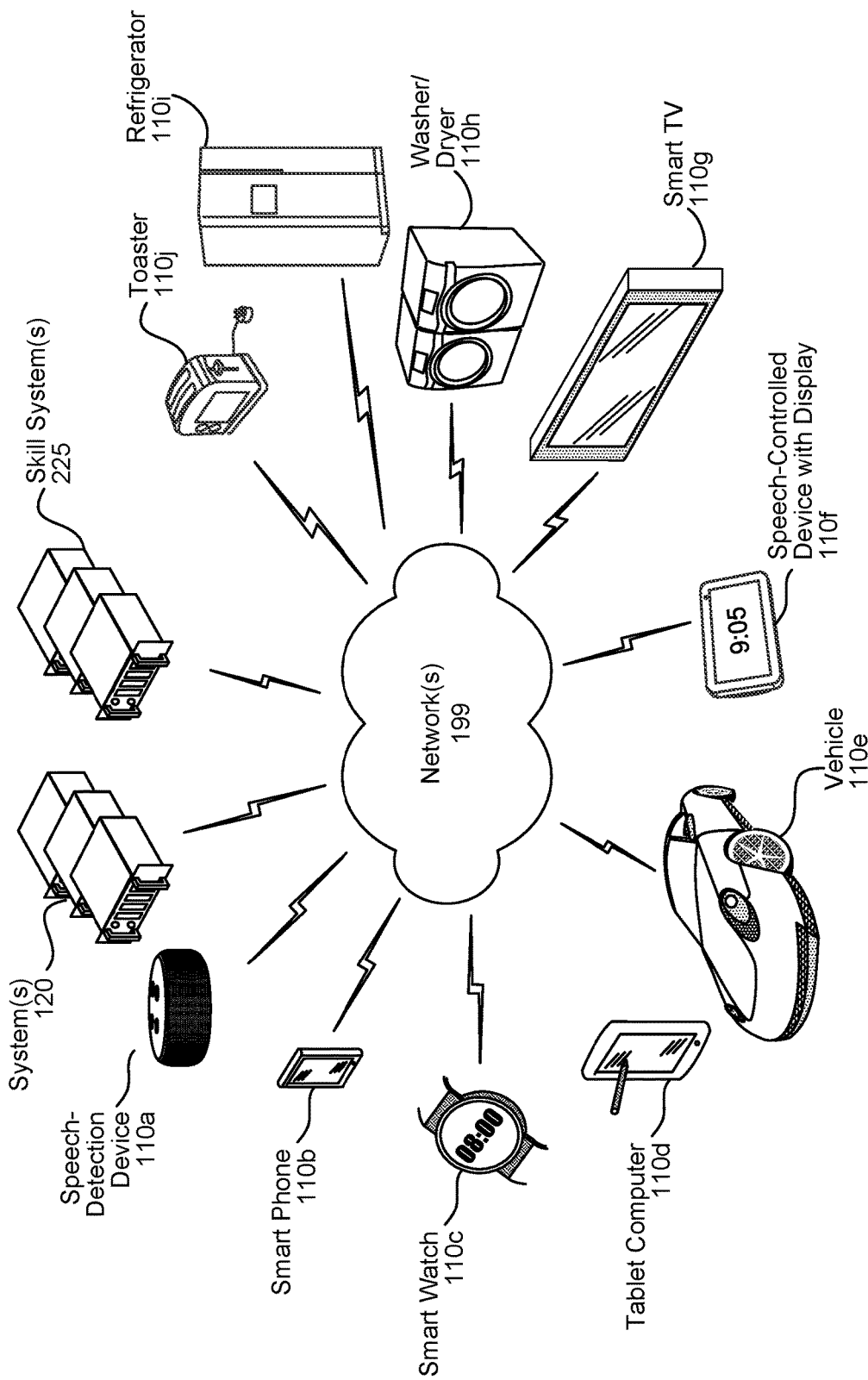
FIG. 17 illustrates an example of a computer network for use with the speech processing system.

As illustrated in FIG. 17, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclo-sure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving audio data representing a user input;
   performing speech processing using the audio data to determine first data representing a first interpretation of the user input;
   determining second data representing an alternate representation of the user input;
   determining third data comprising encoded data corresponding to the user input; and
   processing the first data, the second data, and the third data to select one of the first interpretation or the alternate representation for further processing.

2. The computer-implemented method of claim 1, further comprising:
   performing automatic speech recognition (ASR) using the audio data to determine ASR data; and
   encoding the ASR data to determine the first data.

3. The computer-implemented method of claim 1, further comprising:
performing automatic speech recognition (ASR) using the audio data to determine ASR data;
performing natural language understanding processing (NLU) using the ASR data to determine NLU data; and
encoding the NLU data to determine the first data.

4. The computer-implemented method of claim 1, further comprising:
determining user profile data associated with the user input; and
processing the user profile data to determine the third data.

5. The computer-implemented method of claim 1, wherein the third data represents a user preference for a system-performed action and wherein the method further comprising:
processing the first data to determine the first interpretation corresponds to an ongoing dialog;
processing the second data to determine the alternate representation corresponds to performing an action; and
based at least in part on the third data, selecting the alternate representation for further processing.

6. The computer-implemented method of claim 1, further comprising:
receiving dialog data corresponding to the user input, the dialog data including at least a previous user input and a corresponding system-generated response; and
encoding the dialog data to determine the third data.

7. The computer-implemented method of claim 6, wherein the dialog data further comprises data indicating a skill associated with the system-generated response.

8. The computer-implemented method of claim 1, further comprising:
determining the first interpretation corresponds to a first system-generated response;
determining the first system-generated response is undesired for a period of time; and
based at least in part on the first system-generated response being undesired, causing further processing to be performed using the alternate representation.

9. The computer-implemented method of claim 1, further comprising:
determining, by a first component, output data comprising a first portion representing the first interpretation and a second portion representing the alternate representation.

10. The computer-implemented method of claim 1, further comprising:
determining, by a first component, output data comprising a first portion representing the alternate representation and a second portion comprising an indication to cease processing with regard to the first interpretation.

11. A system, comprising:
at least one processor; and
at least one memory comprising instructions that, when executed by the at least one processor, cause the system to:
receive audio data representing a user input;
perform speech processing using the audio data to determine first data representing a first interpretation of the user input;
determine second data representing an alternate representation of the user input;
determine third data comprising encoded data corresponding to the user input; and
process the first data, the second data, and the third data to select one of the first interpretation or the alternate representation for further processing.

12. The system of claim 11, wherein the at least one memory further comprises instructions that, when executed by the at least one processor, further cause the system to:
perform automatic speech recognition (ASR) using the audio data to determine ASR data; and
encode the ASR data to determine the first data.

13. The system of claim 11, wherein the at least one memory further comprises instructions that, when executed by the at least one processor, further cause the system to:
perform automatic speech recognition (ASR) using the audio data to determine ASR data;
perform natural language understanding processing (NLU) using the ASR data to determine NLU data; and
encode the NLU data to determine the first data.

14. The system of claim 11, wherein the at least one memory further comprises instructions that, when executed by the at least one processor, further cause the system to:
determine user profile data associated with the user input; and
process the user profile data to determine the third data.

15. The system of claim 11, wherein the third data represents a user preference for a system-performed action and wherein the at least one memory further comprises instructions that, when executed by the at least one processor, further cause the system to:
process the first data to determine the first interpretation corresponds to an ongoing dialog;
process the second data to determine the alternate representation corresponds to performing an action; and
based at least in part on the third data, select the alternate representation for further processing.

16. The system of claim 11, wherein the at least one memory further comprises instructions that, when executed by the at least one processor, further cause the system to:
receive dialog data corresponding to the user input, the dialog data including at least a previous user input and a corresponding system-generated response; and
encode the dialog data to determine the third data.

17. The system of claim 16, wherein the dialog data further comprises data indicating a skill associated with the system-generated response.

18. The system of claim 11, wherein the at least one memory further comprises instructions that, when executed by the at least one processor, further cause the system to:
determine the first interpretation corresponds to a first system-generated response;
determine the first system-generated response is undesired for a period of time; and
based at least in part on the first system-generated response being undesired, cause further processing to be performed using the alternate representation.

19. The system of claim 11, wherein the at least one memory further comprises instructions that, when executed by the at least one processor, further cause the system to:
determine, by a first component, output data comprising a first portion representing the first interpretation and a second portion representing the alternate representation.

20. The system of claim 11, wherein the at least one memory further comprises instructions that, when executed by the at least one processor, further cause the system to:
determine, by a first component, output data comprising a first portion representing the alternate representation and a second portion comprising an indication to cease processing with regard to the first interpretation.

* * * * *